(12) United States Patent
Marcotte et al.

(10) Patent No.: US 10,114,867 B2
(45) Date of Patent: Oct. 30, 2018

(54) METHODS AND SYSTEMS FOR SELECTIVELY RETRIEVING DATA TO PROVIDE A LIMITED DATASET FOR INCORPORATION INTO A PIVOT TABLE

(71) Applicant: Looker Data Sciences, Inc., Santa Cruz, CA (US)

(72) Inventors: Daniel Marcotte, San Francisco, CA (US); Lloyd Tabb, Santa Cruz, CA (US)

(73) Assignee: LOOKER DATA SCIENCES, INC., Santa Cruz, CA (US)

(*) Notice: Subject to any disclaimer, the term of this patent is extended or adjusted under 35 U.S.C. 154(b) by 468 days.

(21) Appl. No.: 14/726,403

(22) Filed: May 29, 2015

(65) Prior Publication Data

US 2016/0350308 A1 Dec. 1, 2016

(51) Int. Cl.
*G06F 17/30* (2006.01)

(52) U.S. Cl.
CPC ........ *G06F 17/30489* (2013.01); *G06F 17/30* (2013.01); *G06F 17/3053* (2013.01); *G06F 17/30339* (2013.01); *G06F 17/30598* (2013.01); *G06F 17/30705* (2013.01)

(58) Field of Classification Search
CPC ........... G06F 17/30598; G06F 17/3053; G06F 17/30339; G06F 17/30; G06F 17/30705
USPC .......................... 707/737, 748, 723, E17.089
See application file for complete search history.

(56) References Cited

U.S. PATENT DOCUMENTS

| | | |
|---|---|---|
| 6,092,062 A | 7/2000 | Lohman et al. |
| 6,298,342 B1 | 10/2001 | Graefe et al. |
| 2002/0116417 A1 | 8/2002 | Weinberg et al. |
| 2004/0193575 A1 | 9/2004 | Chen et al. |
| 2005/0010564 A1 | 1/2005 | Metzger et al. |
| 2006/0161528 A1 | 7/2006 | Detiinger et al. |
| 2009/0070303 A1 | 3/2009 | Beavin et al. |
| 2009/0083219 A1 | 3/2009 | Zane et al. |
| 2010/0017436 A1 | 1/2010 | Wolge |
| 2011/0106790 A1 | 5/2011 | Gupta et al. |
| 2013/0086459 A1 | 4/2013 | Folting et al. |
| 2014/0095446 A1 | 4/2014 | Deshmukh et al. |
| 2014/0236965 A1* | 8/2014 | Yarmus ............ G06F 17/30312 707/748 |
| 2014/0280326 A1 | 9/2014 | Tabb et al. |

* cited by examiner

*Primary Examiner* — Robert W Beausoliel, Jr.
*Assistant Examiner* — Pedro J Santos
(74) *Attorney, Agent, or Firm* — Steven M. Greenberg, Esq.; Shutts & Bowen LLP

(57) ABSTRACT

The present disclosure provides inclusive and exclusive approaches, including computer-implemented methods for selectively retrieving data from an initial dataset in a relational database to provide a limited dataset for incorporation into a pivot table. Also provided are related systems and non-transitory computer-readable recording media.

15 Claims, 13 Drawing Sheets

```
SELECT *
FROM (
    SELECT
      *,
      MIN(_r)
      OVER (PARTITION BY g) AS _min_rank
    FROM (
      SELECT
        g,
        p,
        m,
        RANK()
        OVER (
          PARTITION BY p
          ORDER BY m DESC
          ) AS _r
      FROM test
      GROUP BY g, p, m
      ORDER BY g DESC
    )
  ) AS x
WHERE _min_rank <= 2
```

FIG. 12

```
SELECT results.*
FROM (
    -- join to filter our results down to "SORTED_PIVOT_VALUE",
    -- then apply the sort and limit to identify the g values
    -- we will return
    (
      SELECT pivot_join.*
      FROM (
          SELECT
            p
          FROM test
          GROUP BY p
          ORDER BY p
          LIMIT 1
        ) AS pivot_cols
        -- right join to pad our results to the limit if needed
        RIGHT JOIN (
            SELECT
              g,
              p,
              x
            FROM test
          ) AS pivot_join
          ON pivot_join.p = pivot_cols.p
        WHERE pivot_join.p is not null
      ORDER BY x DESC
      LIMIT 2)
    ) AS pivot_info
    -- join back to the full table to fill in any missing x values
    -- for the selected g values
    JOIN (
        SELECT
          g,
          p,
          x
        FROM test
      ) AS results ON pivot_info.g = results.g
    -- join to our pivots again to limit the columns
    LEFT JOIN (
        SELECT
          p
        FROM test
        GROUP BY p
        ORDER BY p
        LIMIT 2
      ) AS column_limiter on results.p = column_limiter.p
where column_limiter.p is not null
```

FIG. 13

METHODS AND SYSTEMS FOR SELECTIVELY RETRIEVING DATA TO PROVIDE A LIMITED DATASET FOR INCORPORATION INTO A PIVOT TABLE

INTRODUCTION

Pivots allow a result from a query to be understood as grouped by a value that was originally a repeated value in a column. Pivoting is usually accomplished by taking some dataset, loading it into memory, and then manipulating it by moving values from rows to columns based on the discrete values in the column to be pivoted. For any size memory allocated to an application, it is possible to create a database result which cannot be loaded into that memory. Accordingly, standard pivoting techniques fail for many real-world scenarios. The present disclosure provides methods and related systems which address this issue.

SUMMARY

In one aspect, the present disclosure provides as part of an inclusive approach, a computer-implemented method for selectively retrieving data from an initial dataset in a relational database to provide a limited dataset for incorporation into a pivot table. The method includes the following steps performed by one or more computer processors: designating and/or receiving a designation of a grouping column in the initial dataset, wherein the grouping column includes one or more groups of grouping values; designating and/or receiving a designation of a partition column in the initial dataset, wherein the partition column includes one or more partition values; designating and/or receiving a designation of an ordering column in the initial dataset, wherein the ordering column includes one or more ordering values, and wherein the initial dataset includes one or more rows, wherein each row includes a corresponding grouping value, a corresponding partition value, and a corresponding ordering value; designating and/or receiving a designation of a specific partition value; identifying rows in the initial dataset which include the specific partition value; selecting the rows that include the specific partition value, and limiting the selected rows based on a ranking of the corresponding ordering value of each selected row to provide a limited set of rows; and expanding the limited set of rows to include all rows that share grouping values in common with the grouping values of the limited set of rows to provide the limited data set.

In another aspect, the present disclosure provides as part of an inclusive approach, a non-transitory computer-readable recording medium for selectively retrieving data from an initial dataset in a relational database to provide a limited dataset for incorporation into a pivot table. The non-transitory computer-readable recording medium includes instructions, which, when executed by one or more processors, cause the one or more processors to: (a) designate and/or receive a designation of a grouping column in the initial dataset, wherein the grouping column includes one or more groups of grouping values; (b) designate and/or receive a designation of a partition column in the initial dataset, wherein the partition column includes one or more partition values; (c) designate and/or receive a designation of an ordering column in the initial dataset, wherein the ordering column includes one or more ordering values, and wherein the initial dataset includes one or more rows, wherein each row includes a corresponding grouping value, a corresponding partition value, and a corresponding ordering value; (d) designate and/or receive a designation of a specific partition value; (e) identify rows in the initial dataset which include the specific partition value; (f) select the rows that include the specific partition value, and limit the selected rows based on a ranking of the corresponding ordering value of each selected row to provide a limited set of rows; and (g) expand the limited set of rows to include all rows that share grouping values in common with the grouping values of the limited set of rows to provide the limited data set.

In another aspect, the present disclosure provides as part of an inclusive approach, a system for selectively retrieving data from an initial dataset of a relational database to provide a limited dataset for incorporation into a pivot table. The system includes a relational database and an application program, wherein the application program: (a) designates and/or receives a designation of a grouping column in the initial dataset, wherein the grouping column includes one or more groups of grouping values; (b) designates and/or receives a designation of a partition column in the initial dataset, wherein the partition column includes one or more partition values; (c) designates and/or receives a designation of an ordering column in the initial dataset, wherein the ordering column includes one or more ordering values, and wherein the initial dataset includes one or more rows, wherein each row includes a corresponding grouping value, a corresponding partition value, and a corresponding ordering value; (d) designates and/or receives a designation of a specific partition value; (e) identifies rows in the initial dataset which include the specific partition value; (f) selects the rows that include the specific partition value, and limits the selected rows based on a ranking of the corresponding ordering value of each selected row to provide a limited set of rows; and (g) expands the limited set of rows to include all rows that share grouping values in common with the grouping values of the limited set of rows to provide the limited data set.

In another aspect, the present disclosure provides as part of an exclusive approach, a computer-implemented method for selectively retrieving data from an initial dataset in a relational database to provide a limited dataset for incorporation into a pivot table. The method includes the following steps performed by one or more computer processors: (a) designating and/or receiving a designation of a grouping column in the initial dataset, wherein the grouping column includes one or more groups of grouping values; (b) designating and/or receiving a designation of a partition column in the initial dataset, wherein the partition column includes one or more partition values; (c) designating and/or receiving a designation of an ordering column in the initial dataset, wherein the ordering column includes one or more ordering values, and wherein the initial dataset includes one or more rows, wherein each row includes a corresponding grouping value, a corresponding partition value, and a corresponding ordering value; (d) partitioning rows of the one or more rows, which share a common partition value, into separate partitions according to the shared common partition value; (e) establishing a ranking value of each of the rows within each separate partition according to the corresponding ordering value of each row; (f) calculating a minimum ranking value for each separate group of grouping values which corresponds to the row within each group having the lowest ranking value; and (g) applying a minimum ranking value limit to each of the separate groups of grouping values to exclude groups of grouping values that do not meet the minimum ranking value limit, wherein the group of grouping values not excluded by the minimum ranking value limit provide the limited dataset.

In another aspect, the present disclosure provides as part of an exclusive approach, a non-transitory computer-readable recording medium for selectively retrieving data from an initial dataset in a relational database to provide a limited dataset for incorporation into a pivot table. The non-transitory computer-readable recording medium includes instructions, which, when executed by one or more processors, cause the one or more processors to: (a) designate and/or receive a designation of a grouping column in the initial dataset, wherein the grouping column includes one or more groups of grouping values; (b) designate and/or receive a designation of a partition column in the initial dataset, wherein the partition column includes one or more partition values; (c) designate and/or receive a designation of an ordering column in the initial dataset, wherein the ordering column includes one or more ordering values, and wherein the initial dataset includes one or more rows, wherein each row includes a corresponding grouping value, a corresponding partition value, and a corresponding ordering value; (d) partition rows of the one or more rows, which share a common partition value, into separate partitions according to the shared common partition value; (e) establish a ranking value of each of the rows within each separate partition according to the corresponding ordering value of each row; (f) calculate a minimum ranking value for each separate group of grouping values which corresponds to the row within each group having the lowest ranking value; and (g) apply a minimum ranking value limit to each of the separate groups of grouping values to exclude groups of grouping values that do not meet the minimum ranking value limit, wherein the group of grouping values not excluded by the minimum ranking value limit provide the limited dataset.

In another aspect, the present disclosure provides as part of an exclusive approach, a system for selectively retrieving data from an initial dataset of a relational database to provide a limited dataset for incorporation into a pivot table. The system includes the relational database and an application program, wherein the application program: (a) designates and/or receives a designation of a grouping column in the initial dataset, wherein the grouping column includes one or more groups of grouping values; (b) designates and/or receives a designation of a partition column in the initial dataset, wherein the partition column includes one or more partition values; (c) designates and/or receives a designation of an ordering column in the initial dataset, wherein the ordering column includes one or more ordering values, and wherein the initial dataset includes one or more rows, wherein each row includes a corresponding grouping value, a corresponding partition value, and a corresponding ordering value; (d) partitions rows of the one or more rows, which share a common partition value, into separate partitions according to the shared common partition value; (e) establishes a ranking value of each of the rows within each separate partition according to the corresponding ordering value of each row; (f) calculates a minimum ranking value for each separate group of grouping values which corresponds to the row within each group having the lowest ranking value; and (g) applies a minimum ranking value limit to each of the separate groups of grouping values to exclude groups of grouping values that do not meet the minimum ranking value limit, wherein the group of grouping values not excluded by the minimum ranking value limit provide the limited dataset.

Any of the above aspects may also provide a pivot table by providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset, and populating each cell defined by each distinct grouping value-partition value pair with the corresponding ordering value from each distinct row in the limited dataset.

Aspects, including embodiments, of the present subject matter described herein may be beneficial alone or in combination, with one or more other aspects or embodiments. Without limiting the foregoing or subsequent description, certain non-limiting aspects of the disclosure are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below.

1. In one aspect, the present disclosure provides a computer-implemented method for selectively retrieving data from an initial dataset in a relational database to provide a limited dataset for incorporation into a pivot table, the method including the following steps performed by one or more computer processors:
   a. receiving a designation of a grouping column in the initial dataset, wherein the grouping column includes one or more groups of grouping values;
   b. receiving a designation of a partition column in the initial dataset, wherein the partition column includes one or more partition values;
   c. receiving a designation of an ordering column in the initial dataset, wherein the ordering column includes one or more ordering values, and wherein the initial dataset includes one or more rows, wherein each row includes a corresponding grouping value, a corresponding partition value, and a corresponding ordering value;
   d. receiving a designation of a specific partition value;
   e. identifying rows in the initial dataset which include the specific partition value;
   f. selecting the rows that include the specific partition value, and limiting the selected rows based on a ranking of the corresponding ordering value of each selected row to provide a limited set of rows; and
   g. expanding the limited set of rows to include all rows that share grouping values in common with the grouping values of the limited set of rows to provide the limited dataset.

2. The method of aspect 1, including a step of providing a pivot table incorporating the limited dataset, wherein the step of providing the pivot table includes:
   a. providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset; and
   b. populating each cell defined by each distinct grouping value-partition value pair with the corresponding ordering value from each distinct row in the limited dataset.

3. The method of aspect 1, wherein the ranking of the corresponding ordering value of each selected row is based on either an ascending order or a descending order.

4. The method of aspect 1, wherein the steps of receiving a designation of a grouping column, a partition column, and an ordering column in the initial dataset are repeated for additional initial datasets in the relational database.
5. The method of aspect 1, wherein a JOIN SQL expression is executed to perform one or more of the steps performed by the one or more computer processors.
6. The method of aspect 1, including executing an OFFSET SQL expression to sort for other partition values included in the partition column.
7. The method of aspect 1, including executing a LIMIT SQL expression to limit the partition values included in the partition column.
8. The method of aspect 1, further including transmitting the limited dataset to an application program included on a client device.
9. The method of aspect 1, including receiving a designation of a row limit for the limited dataset.
10. The method of aspect 9, wherein the step of limiting the selected rows based on a ranking of the corresponding ordering value of each selected row includes executing a RIGHT JOIN SQL expression to selectively retrieve additional rows that do not include the specific partition value to provide the limited dataset.
11. The method of aspect 9, wherein the step of limiting the selected rows based on a ranking of the corresponding ordering value of each selected row includes executing a LEFT JOIN SQL expression to selectively retrieve additional rows that do not include the specific partition value to provide the limited dataset.
12. In another aspect, the present disclosure provides a computer-implemented method for selectively retrieving data from an initial dataset in a relational database to provide a limited dataset for incorporation into a pivot table, the method including the following steps performed by one or more computer processors:
   a. designating a grouping column in the initial dataset, wherein the grouping column includes one or more groups of grouping values;
   b. designating a partition column in the initial dataset, wherein the partition column includes one or more partition values;
   c. designating an ordering column in the initial dataset, wherein the ordering column includes one or more ordering values, and wherein the initial dataset includes one or more rows, wherein each row includes a corresponding grouping value, a corresponding partition value, and a corresponding ordering value;
   d. designating a specific partition value;
   e. identifying rows in the initial dataset which include the specific partition value;
   f. selecting the rows that include the specific partition value, and limiting the selected rows based on a ranking of the corresponding ordering value of each selected row to provide a limited set of rows; and
   g. expanding the limited set of rows to include all rows that share grouping values in common with the grouping values of the limited set of rows to provide the limited dataset.
13. The method of aspect 12, including a step of providing a pivot table incorporating the limited dataset, wherein the step of providing the pivot table includes:
   a. providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset; and
   b. populating each cell defined by each distinct grouping value-partition value pair with the corresponding ordering value from each distinct row in the limited dataset.
14. The method of aspect 12, wherein the ranking of the corresponding ordering value of each selected row is based on either an ascending order or a descending order.
15. The method of aspect 12, wherein the steps of designating a grouping column, a partition column, and an ordering column in the initial dataset are repeated for additional initial datasets in the relational database.
16. The method of aspect 12, wherein a JOIN SQL expression is executed to perform one or more of the steps performed by the one or more computer processors.
17. The method of aspect 12, including executing an OFFSET SQL expression to sort for other partition values included in the partition column.
18. The method of aspect 12, including executing a LIMIT SQL expression to limit the partition values included in the partition column.
19. The method of aspect 12, further including transmitting the limited dataset to an application program included on a client device.
20. The method of aspect 12, including receiving a designation of a row limit for the limited dataset.
21. The method of aspect 20, wherein the step of limiting the selected rows based on a ranking of the corresponding ordering value of each selected row includes executing a RIGHT JOIN SQL expression to selectively retrieve additional rows that do not include the specific partition value to provide the limited dataset.
22. The method of aspect 20, wherein the step of limiting the selected rows based on a ranking of the corresponding ordering value of each selected row includes executing a LEFT JOIN SQL expression to selectively retrieve additional rows that do not include the specific partition value to provide the limited dataset.
23. In another aspect, the present disclosure provides a non-transitory computer-readable recording medium for selectively retrieving data from an initial dataset in a relational database to provide a limited dataset for incorporation into a pivot table including instructions, which, when executed by one or more processors, cause the one or more processors to:
   a. receive a designation of a grouping column in the initial dataset, wherein the grouping column includes one or more groups of grouping values;
   b. receive a designation of a partition column in the initial dataset, wherein the partition column includes one or more partition values;
   c. receive a designation of an ordering column in the initial dataset, wherein the ordering column includes one or more ordering values, and wherein the initial dataset includes one or more rows, wherein each row includes a corresponding grouping value, a corresponding partition value, and a corresponding ordering value;
   d. receive a designation of a specific partition value;
   e. identify rows in the initial dataset which include the specific partition value;

f. select the rows that include the specific partition value, and limit the selected rows based on a ranking of the corresponding ordering value of each selected row to provide a limited set of rows; and g. expand the limited set of rows to include all rows that share grouping values in common with the grouping values of the limited set of rows to provide the limited dataset.

24. The non-transitory computer-readable recording medium of aspect 23, wherein the non-transitory computer-readable recording medium includes instructions, which, when executed by the one or more processors, cause the one or more processors to provide a pivot table incorporating the limited dataset, wherein the step of providing the pivot table includes:

a. providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset; and b. populating each cell defined by each distinct grouping value-partition value pair with the corresponding ordering value from each distinct row in the limited dataset.

25. The non-transitory computer-readable recording medium of aspect 23, wherein the ranking of the corresponding ordering value of each selected row is based on either an ascending order or a descending order.

26. The non-transitory computer-readable recording medium of aspect 23, wherein the steps of receiving a designation of a grouping column, a partition column, and an ordering column in the initial dataset are repeated for additional initial datasets in the relational database.

27. The non-transitory computer-readable recording medium of aspect 23, including instructions including a JOIN SQL expression, which is executed to perform one or more of the steps of aspect 23.

28. The non-transitory computer-readable recording medium of aspect 23 including instructions including an OFFSET SQL expression to sort for other partition values included in the partition column.

29. The non-transitory computer-readable recording medium of aspect 23, including instructions including a LIMIT SQL expression to limit the partition values included in the partition column.

30. The non-transitory computer-readable recording medium of aspect 23, including instructions, which, when executed by the one or more processors, cause the one or more processors to transmit the limited dataset to an application program included on a client device.

31. The non-transitory computer-readable recording medium of aspect 23, including instructions, which, when executed by the one or more processors, cause the one or more processors to receive a designation of a row limit for the limited dataset.

32. The non-transitory computer-readable recording medium of aspect 31, wherein to limit the selected rows based on a ranking of the corresponding ordering value of each selected row, the non-transitory recording medium includes instructions including a RIGHT JOIN SQL expression to selectively retrieve additional rows that do not include the specific partition value to provide the limited dataset.

33. The non-transitory computer-readable recording medium of aspect 31, wherein to limit the selected rows based on a ranking of the corresponding ordering value of each selected row, the non-transitory recording medium includes instructions including a LEFT JOIN SQL expression to selectively retrieve additional rows that do not include the specific partition value to provide the limited dataset.

34. In another aspect, the present disclosure provides a non-transitory computer-readable recording medium for selectively retrieving data from an initial dataset in a relational database to provide a limited dataset for incorporation into a pivot table including instructions, which, when executed by one or more processors, cause the one or more processors to:

a. designate a grouping column in the initial dataset, wherein the grouping column includes one or more groups of grouping values;

b. designate a partition column in the initial dataset, wherein the partition column includes one or more partition values;

c. designate an ordering column in the initial dataset, wherein the ordering column includes one or more ordering values, and wherein the initial dataset includes one or more rows, wherein each row includes a corresponding grouping value, a corresponding partition value, and a corresponding ordering value;

d. designate a specific partition value;

e. identify rows in the initial dataset which include the specific partition value;

f. select the rows that include the specific partition value, and limit the selected rows based on a ranking of the corresponding ordering value of each selected row to provide a limited set of rows; and g. expand the limited set of rows to include all rows that share grouping values in common with the grouping values of the limited set of rows to provide the limited dataset.

35. The non-transitory computer-readable recording medium of aspect 34, wherein the non-transitory computer-readable recording medium includes instructions, which, when executed by the one or more processors, cause the one or more processors to provide a pivot table incorporating the limited dataset, wherein the step of providing the pivot table includes:

a. providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset; and b. populating each cell defined by each distinct grouping value-partition value pair with the corresponding ordering value from each distinct row in the limited dataset.

36. The non-transitory computer-readable recording medium of aspect 34, wherein the ranking of the corresponding ordering value of each selected row is based on either an ascending order or a descending order.

37. The non-transitory computer-readable recording medium of aspect 34, wherein the step of designating a grouping column, a partition column, and an ordering column in the initial dataset are repeated for additional initial datasets in the relational database.

38. The non-transitory computer-readable recording medium of aspect 34, including instructions including a JOIN SQL expression, which is executed to perform one or more of the steps of aspect 23.

39. The non-transitory computer-readable recording medium of aspect 34, including instructions including an OFFSET SQL expression to sort for other partition values included in the partition column.

40. The non-transitory computer-readable recording medium of aspect 34, including instructions including a LIMIT SQL expression to limit the partition values included in the partition column.

41. The non-transitory computer-readable recording medium of aspect 34, including instructions, which, when executed by the one or more processors, cause the one or more processors to transmit the limited dataset to an application program included on a client device.

42. The non-transitory computer-readable recording medium of aspect 34, including instructions, which, when executed by the one or more processors, cause the one or more processors to designate of a row limit for the limited dataset.

43. The non-transitory computer-readable recording medium of aspect 42, wherein to limit the selected rows based on a ranking of the corresponding ordering value of each selected row, the non-transitory recording medium includes instructions including a RIGHT JOIN SQL expression to selectively retrieve additional rows that do not include the specific partition value to provide the limited dataset.

44. The non-transitory computer-readable recording medium of aspect 42, wherein to limit the selected rows based on a ranking of the corresponding ordering value of each selected row, the non-transitory recording medium includes instructions including a LEFT JOIN SQL expression to selectively retrieve additional rows that do not include the specific partition value to provide the limited dataset.

45. In another aspect, the present disclosure provides a system for selectively retrieving data from an initial dataset included by a relational database to provide a limited dataset for incorporation into a pivot table, wherein the system includes the relational database and an application program, wherein the application program:
   a. designates a grouping column in the initial dataset, wherein the grouping column includes one or more groups of grouping values;
   b. designates a partition column in the initial dataset, wherein the partition column includes one or more partition values;
   c. designates an ordering column in the initial dataset, wherein the ordering column includes one or more ordering values, and wherein the initial dataset includes one or more rows, wherein each row includes a corresponding grouping value, a corresponding partition value, and a corresponding ordering value; and
wherein the relational database:
   d. designates a specific partition value;
   e. identifies rows in the initial dataset which include the specific partition value;
   f. selects the rows that include the specific partition value, and limits the selected rows based on a ranking of the corresponding ordering value of each selected row to provide a limited set of rows; and
   g. expands the limited set of rows to include all rows that share grouping values in common with the grouping values of the limited set of rows to provide the limited dataset.

46. The system of aspect 45, wherein the application program provides a pivot table incorporating the limited dataset, wherein the step of providing the pivot table includes:
   a. providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset; and
   b. populating each cell defined by each distinct grouping value-partition value pair with the corresponding ordering value from each distinct row in the limited dataset.

47. The system of aspect 45, wherein the ranking of the corresponding ordering value of each selected row is based on either an ascending order or a descending order.

48. The system of aspect 45, wherein the steps of designating a grouping column, a partition column, and an ordering column in the initial dataset are repeated for additional initial datasets in the relational database.

49. The system of aspect 45, wherein a JOIN SQL expression is executed to perform one or more of the steps performed by the one or more computer processors.

50. The system of aspect 45, including executing an OFFSET SQL expression to sort for other partition values included in the partition column.

51. The system of aspect 45, including executing a LIMIT SQL expression to limit the partition values included in the partition column.

52. The system of aspect 45, wherein the application program designates a row limit for the limited dataset.

53. The system of aspect 52, wherein the step of limiting the selected rows based on a ranking of the corresponding ordering value of each selected row includes executing a RIGHT JOIN SQL expression to selectively retrieve additional rows that do not include the specific partition value to provide the limited dataset.

54. The system of aspect 52, wherein the step of limiting the selected rows based on a ranking of the corresponding ordering value of each selected row includes executing a LEFT JOIN SQL expression to selectively retrieve additional rows that do not include the specific partition value to provide the limited dataset.

55. In another aspect, the present disclosure provides a computer-implemented method for selectively retrieving data from an initial dataset in a relational database to provide a limited dataset for incorporation into a pivot table, the method including the following steps performed by one or more computer processors:
   a. receiving a designation of a grouping column in the initial dataset, wherein the grouping column includes one or more groups of grouping values;
   b. receiving a designation of a partition column in the initial dataset, wherein the partition column includes a plurality of partition values including one or more partition values;

c. receiving a designation of an ordering column in the initial dataset, wherein the ordering column includes one or more ordering values, and wherein the initial dataset includes one or more rows, wherein each row includes a corresponding grouping value, a corresponding partition value, and a corresponding ordering value;

d. partitioning rows of the one or more rows, which share a common partition value, into separate partitions according to the shared common partition value;

e. establishing a ranking value of each of the rows within each separate partition according to the corresponding ordering value of each row;

f. calculating a minimum ranking value for each separate group of grouping values which corresponds to the row within each group having the lowest ranking value; and g. applying a minimum ranking value limit to each of the separate groups of grouping values to exclude groups of grouping values that do not meet the minimum ranking value limit, wherein the group of grouping values not excluded by the minimum ranking value limit provide the limited dataset.

56. The method of aspect 55, including a step of providing a pivot table incorporating the limited dataset, wherein the step of providing the pivot table includes:

a. providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset; and b. populating each cell defined by each distinct grouping value-partition value pair with the corresponding ordering value from each distinct row in the limited dataset.

57. The method of aspect 55, wherein the steps of receiving a designation of a grouping column, a partition column, and an ordering column in the initial dataset are repeated for additional initial datasets in the relational database.

58. The method of aspect 55, further including using a LIMIT SQL expression to limit the values of interest included in the partition column.

59. The method of aspect 55, further including transmitting the limited dataset from the relational database to an application program included on a client device.

60. In another aspect, the present disclosure provides a computer-implemented method for selectively retrieving data from an initial dataset in a relational database to provide a limited dataset for incorporation into a pivot table, the method including the following steps performed by one or more computer processors:

a. designating a grouping column in the initial dataset, wherein the grouping column includes one or more groups of grouping values;

b. designating a partition column in the initial dataset, wherein the partition column includes one or more partition values;

c. designating an ordering column in the initial dataset, wherein the ordering column includes one or more ordering values, and wherein the initial dataset includes one or more rows, wherein each row includes a corresponding grouping value, a corresponding partition value, and a corresponding ordering value;

d. partitioning rows of the one or more rows, which share a common partition value, into separate partitions according to the shared common partition value;

e. establishing a ranking value of each of the rows within each separate partition according to the corresponding ordering value of each row;

f. calculating a minimum ranking value for each separate group of grouping values which corresponds to the row within each group having the lowest ranking value; and g. applying a minimum ranking value limit to each of the separate groups of grouping values to exclude groups of grouping values that do not meet the minimum ranking value limit, wherein the group of grouping values not excluded by the minimum ranking value limit provide the limited dataset.

61. The method of aspect 60, including a step of providing a pivot table incorporating the limited dataset, wherein the step of providing the pivot table includes:

a. providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset; and b. populating each cell defined by each distinct grouping value-partition value pair with the corresponding ordering value from each distinct row in the limited dataset.

62. The method of aspect 60, wherein the steps of designating a grouping column, a partition column, and an ordering column in the initial dataset are repeated for additional initial datasets in the relational database.

63. The method of aspect 60, further including using a LIMIT SQL expression to limit the values of interest included in the partition column.

64. The method of aspect 60, further including transmitting the limited dataset from the relational database to an application program included on a client device.

65. In another aspect, the present disclosure provides a non-transitory computer-readable recording medium for selectively retrieving data from an initial dataset in a relational database to provide a limited dataset for incorporation into a pivot table including instructions, which, when executed by one or more processors, cause the one or more processors to:

a. receive a designation of a grouping column in the initial dataset, wherein the grouping column includes one or more groups of grouping values;

b. receive a designation of a partition column in the initial dataset, wherein the partition column includes one or more partition values;

c. receive a designation of an ordering column in the initial dataset, wherein the ordering column includes one or more ordering values, and wherein the initial dataset includes one or more rows, wherein each row includes a corresponding grouping value, a corresponding partition value, and a corresponding ordering value;

d. partition rows of the one or more rows, which share a common partition value, into separate partitions according to the shared common partition value;
e. establish a ranking value of each of the rows within each separate partition according to the corresponding ordering value of each row;
f. calculate a minimum ranking value for each separate group of grouping values which corresponds to the row within each group having the lowest ranking value; and
g. apply a minimum ranking value limit to each of the separate groups of grouping values to exclude groups of grouping values that do not meet the minimum ranking value limit, wherein the group of grouping values not excluded by the minimum ranking value limit provide the limited dataset.

66. The non-transitory computer-readable recording medium of aspect 65, wherein the non-transitory computer-readable recording medium includes instructions, which, when executed by the one or more processors, cause the one or more processors to provide a pivot table incorporating the limited dataset, wherein the step of providing the pivot table includes:
   a. providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset; and
   b. populating each cell defined by each distinct grouping value-partition value pair with the corresponding ordering value from each distinct row in the limited dataset.

67. The non-transitory computer-readable recording medium of aspect 65, wherein the steps of receiving a designation of a grouping column, a partition column, and an ordering column in the initial dataset are repeated for additional initial datasets in the relational database.

68. The non-transitory computer-readable recording medium of aspect 65, further including instructions including a LIMIT SQL expression, which is executed to limit the values of interest included in the partition column.

69. In another aspect, the present disclosure provides a non-transitory computer-readable recording medium for selectively retrieving data from an initial dataset in a relational database to provide a limited dataset for incorporation into a pivot table including instructions, which, when executed by one or more processors, cause the one or more processors to:
   a. designate a grouping column in the initial dataset, wherein the grouping column includes one or more groups of grouping values;
   b. designate a partition column in the initial dataset, wherein the partition column includes one or more partition values;
   c. designate an ordering column in the initial dataset, wherein the ordering column includes one or more ordering values, and wherein the initial dataset includes one or more rows, wherein each row includes a corresponding grouping value, a corresponding partition value, and a corresponding ordering value;
d. partition rows of the one or more rows, which share a common partition value, into separate partitions according to the shared common partition value;
e. establish a ranking value of each of the rows within each separate partition according to the corresponding ordering value of each row;
f. calculate a minimum ranking value for each separate group of grouping values which corresponds to the row within each group having the lowest ranking value; and
g. apply a minimum ranking value limit to each of the separate groups of grouping values to exclude groups of grouping values that do not meet the minimum ranking value limit, wherein the group of grouping values not excluded by the minimum ranking value limit provide the limited dataset.

70. The non-transitory computer-readable recording medium of aspect 69, wherein the non-transitory computer-readable recording medium includes instructions, which, when executed by the one or more processors, cause the one or more processors to provide a pivot table incorporating the limited dataset, wherein the step of providing the pivot table includes:
   a. providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset; and
   b. populating each cell defined by each distinct grouping value-partition value pair with the corresponding ordering value from each distinct row in the limited dataset.

71. The non-transitory computer-readable recording medium of aspect 69, wherein the steps of designating a grouping column, a partition column, and an ordering column in the initial dataset are repeated for additional initial datasets in the relational database.

72. The non-transitory computer-readable recording medium of aspect 69, further including instructions including a LIMIT SQL expression, which is executed to limit the values of interest included in the partition column.

73. In another aspect, the present disclosure provides a system for selectively retrieving data from an initial dataset included by a relational database to provide a limited dataset for incorporation into a pivot table, wherein the system includes the relational database and an application program, wherein the application program:
   a. designates a grouping column in the initial dataset, wherein the grouping column includes one or more groups of grouping values;
   b. designates a partition column in the initial dataset, wherein the partition column includes one or more partition values;
   c. designates an ordering column in the initial dataset, wherein the ordering column includes one or more ordering values, and wherein the initial dataset includes one or more rows, wherein each row includes a corresponding grouping value, a corresponding partition value, and a corresponding ordering value; and wherein the database:
    d. partitions rows of the one or more rows, which share a common partition value, into separate partitions according to the shared common partition value;
    e. establishes a ranking value of each of the rows within each separate partition according to the corresponding ordering value of each row;
    f. calculates a minimum ranking value for each separate group of grouping values which corresponds to the row within each group having the lowest ranking value; and
    g. applies a minimum ranking value limit to each of the separate groups of grouping values to exclude groups of grouping values that do not meet the minimum ranking value limit, wherein the group of grouping values not excluded by the minimum ranking value limit provide the limited dataset.

74. The system of aspect 73, wherein the application program provides a pivot table incorporating the limited dataset, wherein the step of providing the pivot table includes:
    a. providing a table including a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset; and
    b. populating each cell defined by each distinct grouping value-partition value pair with the corresponding ordering value from each distinct row in the limited dataset.

75. The system of aspect 73, wherein the steps of designating a grouping column, a partition column, and an ordering column in the initial dataset are repeated for additional initial datasets in the relational database.

76. The system of aspect 73, wherein a LIMIT SQL expression is executed to limit the values of interest included in the partition column.

BRIEF DESCRIPTION OF THE DRAWINGS

FIGS. 9A-9D are examples of datasets of a method for selectively retrieving data from an initial dataset to provide a limited dataset, according to an example embodiment.

FIGS. 10A-10D are examples of datasets of a method for selectively retrieving data from an initial dataset to provide a limited dataset, according to an example embodiment.

FIG. 12 is an example of a SQL expression for selectively retrieving data from an initial dataset to provide a limited dataset, according to an example embodiment.

FIG. 13 is an example of a SQL expression for selectively retrieving data from an initial dataset to provide a limited dataset, according to an example embodiment.

DETAILED DESCRIPTION

Figure 1:
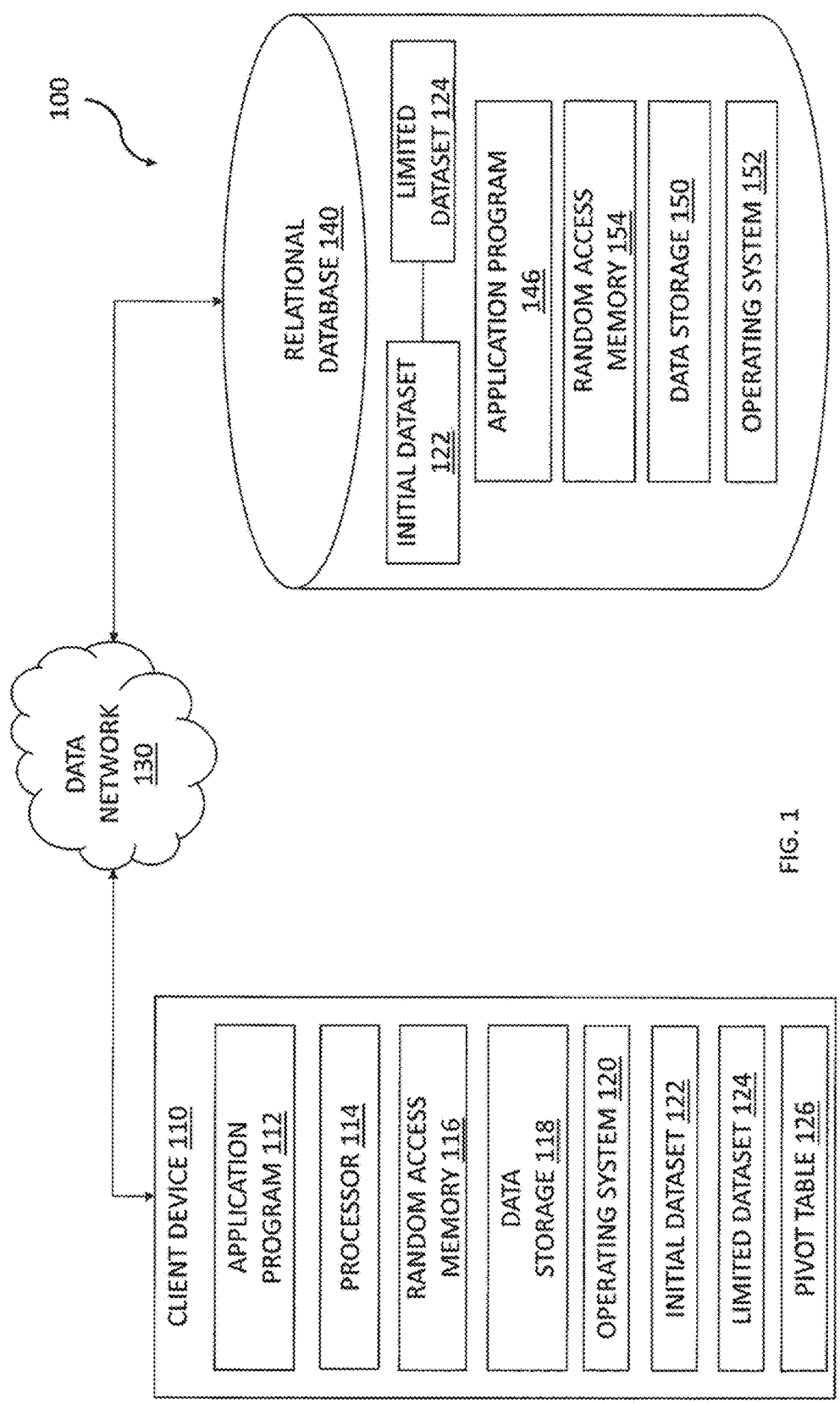
FIG. 1 is a block diagram of a system for selectively retrieving data from an initial dataset to provide a limited dataset, according to an example embodiment.

As discussed above, pivoting is usually accomplished by taking some dataset, loading it into memory, and then manipulating it by moving values from rows to columns based on the discrete values in the column to be pivoted. However, the physical limits of the memory may restrict the size of the dataset that may be loaded therein. Furthermore, a particular dataset may include data which may not be of relevance to a user. The present disclosure provides methods for selectively retrieving only the data that is of relevance to a user.

One approach, referred to herein as the "Exclusive Approach" functions to filter down an initial dataset by eliminating rows which will not contribute to a particular pivot table to provide a limited dataset which can be uses to populate the pivot table. Another approach, referred to herein as the "Inclusive Approach" functions to calculate precisely the rows needed to fill a particular pivot table and includes only those rows in a limited dataset which can be used to populate the pivot table. In some embodiments, the above approaches are implemented using Structured Query Language (SQL). The approaches described herein represent a more efficient means for a user to obtain desired information from a relational database relative to those currently used in the art.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs.

Any and all publications mentioned herein are incorporated herein by reference to disclose and describe the methods and/or materials in connection with which the publications are cited. It is understood that the present disclosure supersedes any disclosure of an incorporated publication to the extent there is a contradiction. Further, the dates of any such publications provided may be different from the actual publication dates which may need to be independently confirmed.

It must be noted that as used herein and in the appended claims, the singular forms "a", "an", and "the" include plural referents unless the context clearly dictates otherwise. Thus, for example, reference to "a database" includes a plurality of such databases, and so forth.

It is further noted that the claims may be drafted to exclude any element, e.g., any optional element. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Although any methods and materials similar or equivalent to those described herein can be used in the practice of the present invention, some potential and exemplary methods and materials are now described.

An example of the inefficiencies, which may be addressed by the methods and systems described herein, is a situation in which an application program attempts to process more data from a database than that which is capable of being processed within the physical limits of the memory of the application program. Furthermore, even where the data can be processed within the physical limits of the memory, data which may not be of relevance is aggregated in a dataset along with data that may be of relevance to the user. Accordingly, the presentation of aggregated data in the dataset may be presented in a disorganized manner. According to aspects of the methods and systems described herein, data which may be of relevance to a user may be selectively retrieved from an initial dataset, such that relevant data is parsed from non-relevant data.

The methods for selectively retrieving data from an initial dataset for providing a limited dataset for incorporation into a pivot table as described herein represent improved approaches, which do not suffer from the inefficiencies described above. Selectively retrieving data involves either excluding data which may not be of relevance to a user and/or including data which may be of relevance to a user. Via an application program on a client device, a user may be able to specify data which may be of relevance to the user as well as restrict the data in the initial dataset which is thereafter aggregated and output into a limited dataset.

As described, a "dataset" refers generally to a collection of data. In some examples, the dataset may include one or more rows of data and one or more columns of data. Within the dataset, each row of data and/or each column of data may be represented by a row and/or column identifier to display to the user the type of values that are included within each row and/or column.

In some embodiments, the dataset may refer to an initial dataset. As described herein, the term "initial dataset" refers generally to a collection of data from one or more tables in a relational database. In some examples, the initial dataset may be stored in the data storage and/or the memory of a client device. In other examples, the initial dataset may be stored in the data storage and/or the memory of a database.

According to one embodiment, the initial dataset may include a grouping column, a partition column, and an ordering column. The grouping column, partition column, and ordering column may be columns of data which have been previously designated by a user. In some examples, designation of columns of data may be arbitrarily designated.

In other examples, an application program may be used to determine which distinct columns of data in an initial dataset are designated as a grouping column, a partition column, and an ordering column, e.g., based upon previous user history. The designation of grouping column, partition column and ordering column is now described in greater detail with reference to Table 1 below.

TABLE 1

| Month | Gender | Order count |
| --- | --- | --- |
| February 2014 | Male | 10 |
| February 2014 | Female | 15 |
| January 2014 | Male | 9 |
| January 2014 | Female | 22 |
| December 2013 | Male | 8 |
| December 2013 | Female | 4 |

In the table above, the data may be representative of the number of Males/Females who have placed an order from an e-commerce site over a three-month period. Here, the user may designate, for example, the "Month" column as the grouping column, the "Gender" column as the partition column, and the "Order count" column as the ordering column, e.g., via the application program provided on the client device.

In some examples, if the user has frequently designated the month column as the grouping column and the gender column as the partition column in previous instances, then the application program may conclude that repetition and frequency of selecting gender as the partition column indicates the user's preference for future designation of column inputs. Accordingly, the application program may be programmed to automatically designate the grouping column, partition column, and ordering column with minimal input and/or no input from the user. For example, a benefit of the application program being able to automatically designate the grouping column, partition column, and ordering column with minimal input and/or no input from the user is that the data to be processed in the initial dataset may be more quickly processed through a seamless process that requires little-to-no user input and prevents delayed processing of data by bypassing the need to wait for the user to designate the distinct columns. This may be beneficial where there is a need to process a significant amount of data included across a large sample of initial datasets, for example, during an extended time period.

As described herein, a "grouping column" generally refers to a column in a dataset, e.g., in an initial dataset, that includes one or more grouping values as described herein. Each distinct grouping value of the grouping column may be part of an overall hierarchy of a group of grouping values. In some embodiments, at least one of the distinct grouping values is a repeated value, e.g., a value that appears in two or more rows of the grouping column, and is known as a "repeated grouping value."

As described herein, a "partition column" generally refers to a column in a dataset, e.g., an initial dataset, that includes one or more partition values as described herein. Each distinct partition value of the partition column may be part of an overall hierarchy of a partition of partition values. In some embodiments, at least one of the distinct partition values is a repeated value, e.g., a value that appears in two or more rows of the partition column. In some examples, the application program may designate a "repeated partition value." This term refers generally to a partition value which is repeated in two or more rows of the partition column.

As described herein, an "ordering column" generally refers to a column in a dataset, e.g., the initial dataset, that includes one or more ordering values as described herein. Each ordering value corresponds generally to a grouping value and a partition value. For example, a particular row of an initial dataset may contain a grouping value in a grouping column, a corresponding partition value in a partition column, and a corresponding ordering value in an ordering column. In some embodiments, the corresponding ordering value of each row of the dataset may be used to determine a ranking value of each row within each separate partition.

The term "value" as used herein generally refers to a numerical value. In other embodiments, a "value" does not include a number. For example, in some embodiments, the ordering value may be a symbol, text, or words. In such instances, a suitable application program, e.g., a database application program, may have a built-in algorithm which uses logic to rank non-numerical values, e.g., text or symbols. Any suitable ranking algorithm known in the art may be used in this regard. These values may apply to grouping values, partition values, and ordering values.

As described herein, the term "ranking" generally refers to the process of establishing a ranking value for each row included within each separate partition and/or establishing a minimum ranking value limit for groups of grouping values, according to some embodiments. In some embodiments, the term "ranking value" generally refers to a ranking value established for each of the rows within each separate partition according to the ordering value of each row. In some embodiments, ranking of each row within a separate partition is determined according to the ordering value of each row relative to the ordering values of other rows included in each partition.

In some embodiments, ranking the rows within each separate partition may be done via an ascending ranking order (e.g., 1 is lowest and 10 is highest rank) or descending ranking order (e.g., 1 is highest and 10 is lowest rank)

The term "minimum ranking value" generally refers to a minimum ranking value established for each distinct group of grouping values. In some embodiments, the minimum ranking value can be determined by looking to all the rows included within each distinct group of grouping values and identifying the rows having the lowest ranking value.

In some embodiments, the minimum rank is determined using the SQL expression: min_rank, wherein "min_rank" represents the value of applying a "MIN" command to the result of a "RANK" command. For example, to determine the minimum rank of columns (g-p) in a dataset, an appropriate SQL expression is min_rank (g-p). It should he noted that while a particular SQL dialect may be utilized for the purposes of example herein, any suitable SQL dialect or database query language may be utilized in connection with the methods and systems described herein.

The term "minimum ranking value limit" is generally used to refer to applying a minimum ranking value limit to each of separate groups of grouping values. A suitable application program may identify those groups that fail to meet the minimum ranking value limit and thereafter exclude such groups (i.e., all rows and their corresponding columnar data included within each distinct group) from being provided in the limited dataset.

In some embodiments, the minimum ranking value limit is determined using the SQL expression: min(_r)>LIMIT, where (_r) represents a ranking value limit. For example, where a min_rank<=2 is specified, the application software will exclude those groups of grouping values where the min_rank is less than or equal to 2.

In some embodiments, the minimum ranking value limit may be utilized to limit data from an initial dataset to be provided in a limited dataset thereby limiting the amount of data that needs to be processed in the available memory of the relational database.

The SQL expression min(_r)>LIMIT implies that no matter which sorting value is pivoted, this row cannot possibly be in the limited dataset because it would have been excluded according to the ranking limit. For example, see below.

```
SELECT *
FROM (
    SELECT
    *,
    MIN(_r)
    OVER PARTITION BY g) AS _min_rank
    FROM (
    SELECT
    g,
    p,
    m,
    RANK ( )
    OVER (
        PARTITION BY p
        ORDRE BY m DESC
        ) AS _r
    FROM test
    GROUP BY g, p, m
    ORDER BY g DESC
    )
    ) AS x
WHERE _min_rank <=2
```

The initial dataset, limited dataset, and pivot table generally include a collection of values. As described herein, "values" refers to integers, fractional numbers, and non-numerical values such as symbols, letters, or words, or a combination thereof. One example of symbol values may be ♂ (male) and ♀ (female). One example of word values may be "male" and "female".

If the data being limited is not an integer, then it may need to be converted into an integer in order to be encoded in the SQL expression, and then converted back after computation, this may require additional information about the range of values and precision needed in those values.

In some embodiments, the dataset may refer to a limited dataset. As described herein, the term "limited dataset" refers generally to a collection of data which is limited relative to an initial dataset, e.g. according to certain criteria, and which may be used to populate a pivot table as described herein.

In some embodiments, one or more initial datasets may be selected in order to provide one or more limited datasets.

In some embodiments, the step of providing a limited dataset may be followed by a step of incorporating the limited dataset into a pivot table. As described herein, a "pivot table" refers generally to a data summarization tool which reorganizes and summarizes selected columns and rows of data for presentation to a user relative to the way the columns and rows of data are stored in one or more tables of a relational database without altering the original data structure. During the pivoting step, the user may be able to change the manner in which data is presented by virtually or graphically altering the structure of the fields of data in the data table. In some embodiments, pivoting a data table may be executed via dragging and dropping fields on a spreadsheet application. The user may also use drag-and-select gestures to select those fields of data to be virtually or graphically altered. "Pivoting" a data table may also be known as "rotating" a data table.

As described herein, the term "limited set of rows" generally refers to a set of rows which result from limiting a collection of row values in one or more initial datasets via a rule or instruction which is executed by a suitable application program, e.g., a database application program. In some embodiments, the rows in the initial dataset that include a repeating partition value may be further limited by ranking the corresponding ordering value of each selected row to provide the limited set of rows.

In some embodiments, the pivot table may be incorporated from a table including a row for each distinct grouping value and a column for each distinct partition value in the limited dataset. Each distinct grouping value and each distinct partition value may form a distinct grouping value-partition value pair that defines a unique cell in the pivot table. The unique cell in the pivot table may correspond to a distinct row of the limited dataset. The unique cell in the pivot table may be populated by each distinct grouping value-partition value pair with a corresponding ordering value from each distinct row in the limited dataset.

In some embodiments, designation of the grouping column, partition column, and ordering column not only facilitates selectively retrieving data from an initial dataset to provide a limited dataset, but also facilitates the pivoting of the limited dataset to be incorporated into a pivot table.

The terms described above are not intended to be limited to combinations of aspects explicitly provided above. For example, initial datasets and limited datasets may also incorporate the terms described above as generally applied to datasets.

In some embodiments, the grouping column and the partition column may not include any repeated grouping values and shared common partition values in the initial dataset. Nevertheless, the application program may still be programmed to effectively carry out the step of designating distinct groups of grouping values where there is no repeated grouping values and the step of creating distinct partitions of partitioning values, even where there is no shared common partition value in the initial dataset to provide a limited dataset.

In some embodiments, a suitable application program, e.g., a database application program, may be configured to provide a single limited dataset from multiple initial datasets, e.g., using data originating from multiple database tables and/or from tables originating from multiple databases. In other embodiments, the application program may be configured to provide multiple limited datasets from multiple initial datasets. In other embodiments, the application program may be configured to provide multiple limited datasets from a single initial dataset.

In some embodiments, the method for selectively retrieving data from a plurality of initial datasets can be initiated from a single client device. In some embodiments, the method for selectively retrieving data from a plurality of initial datasets can be initiated from multiple client devices. In some embodiments, multiple client devices may coordinate (or work in collaboration) to determine data to be selectively retrieved from the initial dataset. In some embodiments, the method of multiple client devices working in coordination to determine the data to be selectively retrieved may occur in real-time via a process known in the art as collaborative editing. In such examples, multiple users using different computers may be able to determine which data is to be selectively retrieved from an initial dataset. In real-time collaborative editing, multiple users may edit the same process of selectively retrieving data simultaneously. In other examples, multiple users may edit the same process of selectively retrieving data in non-real-time collaborative editing which may allow different users access or authority to edit the same file, but not at the same time. For instance, a subordinate user may be tasked with designating one or more commands for designating the method; however, the application program in the relational database may not execute the steps of data retrieval until a supervisor user approves of the subordinate user's commands.

As described herein, a "data network" may refer to any type of communication network, including an Internet work (e.g., wide area network (WAN) or local area network (LAN), wired or wireless network. Zig-Bee, or personal area networks (PAN), such as Bluetooth or IEEE 802.15.1, or Wi-Fi IEEE 802.11 or a cellular data network or a global data network. In some embodiments, the data network may be cloud based.

As described herein, a "client device" may refer to a personal computer, such as laptop, or also may refer to a mobile device or may refer to a computer tablet. Generally speaking, the client device refers to any hardware component including a processor or central processing unit ("CPU") and a memory and a means of sending and receiving instructions. In some embodiments, the computer processor of the client device may be programmed to transmit and/or receive packets of data. In some embodiments, the client device may further include a data storage unit. In some embodiments, the client device may include a suitable application program, e.g., a database application program, configured to execute instructions and/or receive instructions related to the process of selectively retrieving data from an initial dataset to provide a limited dataset. In addition, the application program, e.g., database application program, may be configured to execute the step of pivoting the limited dataset to provide a pivot data table.

In some embodiments, the client device may include a non-transitory computer-readable recordable medium that includes the application program, e.g., the database application program, for implementing the methods described herein.

As described above, the client device may be a first computing device or a component thereof. Alternatively, or in addition, a client device may include a second computing device or a component thereof. In some instances, the computing device may be a computer server. In some embodiments, the computing device may be a personal computer, tablet, and/or smartphone.

As described herein, the term "database" refers generally to an organized collection of data stored in memory. In some embodiments, the database may be a relational database. In some embodiments, the database may include a server. In other embodiments, the term "database" may refer to computer software applications configured to interact with one or more client devices in order to analyze, capture, store, and process data. In other embodiments, the term "database" may refer to physical storage of data, such as hard disk storage. Or, in other embodiments, the term "database" may refer to a cloud-based storage system. Examples in industry include Google Drive and iCloud.

In some embodiments, the computer-implemented methods for selectively retrieving data from an initial dataset to provide a limited dataset can be implemented at least in part using structured query language (SQL). In some embodiments, the methods may be implemented at least in part using Hybrid-SQL instructions. In other embodiments, the methods may be implemented at least in part via NoSQL, xQuery, XPath, QUEL, MQL, LNQ. Any suitable query language that can be used to execute the methods described herein may be utilized in connection with such methods.

In one embodiment of interest, the one or more databases are relational databases and the database query language is SQL. In some such embodiments, methods according to the present disclosure include a step of receiving from a user a command to selectively limit data from one or more initial datasets to populate a limited dataset. In some embodiments, the database query is a hybrid SQL query.

As described herein, the term "application program" refers generally to specialized functions or instructions configured to be run by a general computer. Such specialized functions or instructions may be generally known to one of ordinary skill in the art as software. In some embodiments, the application program may run via a combination of basic computer components, including a computer processor, memory (e.g., RAM), data storage, and operating system (generally stored in computer database).

In some embodiments, the client device and/or relational database may include one or more computer processors. The one or more processors may execute instructions stored in the memory or storage of the client device and/or relational database. The application program may cause one or more instructions to be executed in order to selectively retrieve data from an initial dataset to provide a limited dataset. In some embodiments, the application program may be a web-based program. For example, web-based applications may be written with HTML or Javascript or other web-native technologies that can be administered while the user is running a web browser over the internet.

Methods, Systems, and Devices

Exemplary methods, systems and devices of the present disclosure are now described with reference to the Figures.

FIG. 1 illustrates a block diagram of a system for selectively retrieve data for providing a limited dataset from one or more initial datasets, according to one example embodiment. As illustrated in FIG. 1, the system 100 generally includes a client device 110, a data network 130, and a database 140.

The client device 110 may include, but is not limited to, application program 112 to execute commands or instructions to selectively retrieve data from the initial dataset to provide a limited dataset and/or incorporate the limited dataset into a pivot table. The client device 110 may further include a processor 114, random access memory (RAM) 116, and permanent data storage 118. In other examples, the data storage may be either substituted with or supplemented by a cloud-based storage (not illustrated). In some embodiments, the initial dataset 122 may originate from the client device 110, and the computer processor of client device 110 may be programmed to transmit the initial dataset 122 to the relational database 140. In some embodiments, the computer processor of the client device 110 may be programmed to receive the limited dataset 124 from the database 140, and further utilize the limited dataset to provide a pivot table 126, which may be displayed, for example, on the client device. In some embodiments, the computer processor of the client device may be programmed to transmit a single initial dataset to a plurality of databases. In other examples, the client device may be programed to transmit multiple initial datasets to a plurality of databases.

The application program may be implemented by the operating system of the client device. In other examples, the application program 112 may be stored in a non-transitory computer-readable recordable medium. In another example, the software application 112 may be a web-based application and stored on an external server or external database (not illustrated).

The data network 130 may refer to any type of communication network, including an Internet network (e.g., wide area network (WAN) or local area network (LAN), wired or wireless network. Zig-Bee, or personal area networks (PAN), such as Bluetooth or IEEE 802.15.1, or Wi-Fi IEEE 802.11 or a cellular data network or a global data network. In some embodiments, the data network may be cloud based.

Storage devices 118 also include one or more non-transient computer-readable storage media. Storage devices 118 may further be configured for long-term storage of information. In some embodiments, storage devices 118 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

Wireless networks as described herein may include, but are not limited to, Code Divisional Multiple Access (CDMA) networks, the Group Special Mobile or the Global System for Mobile Communications (GSM) and the General Packet Radio Service (GPRS) networks, third-generation (3G) networks such as Enhanced Data-rates for Global Evolution (EDGE) and Universal Mobile Telecommunications Systems (UMTS), fourth-generation (4G) networks such as Mobile WiMax and Long Term Evolution (LTE), International Mobile Telecommunications-Advanced (IMT-Advanced) networks, and future fifth-generation (5G) networks exceeding the capabilities of the current 4G/IMT-Advanced standards. Examples of wireless networks include, for example, a BLUETOOTH network, a wireless personal area network, a wireless 802.11 local area network (LAN), and/or wireless telephony network (e.g., a cellular, PCS, or GSM network).

The relational database 140 may include data storage 150 such as a data storage units and/or a web-based storage device (not illustrated). For example, web-based storage may be known as cloud based storage. For example, the database 140 may be programmed to receive instructions from the client device 110 instructing the application program 146 of the database 140 to execute commands or instruction to selectively retrieve data from an initial dataset. The database 140 may be further programmed to receive an initial dataset from the client device 110. In other examples, the initial dataset 122 may instead be initially stored in the data storage of the database or in a cloud-based storage. (i.e., cloud storage). In some embodiments, the limited dataset 124 may be stored in the database storage 150 or a cloud-based storage (not illustrated).

Figure 2:
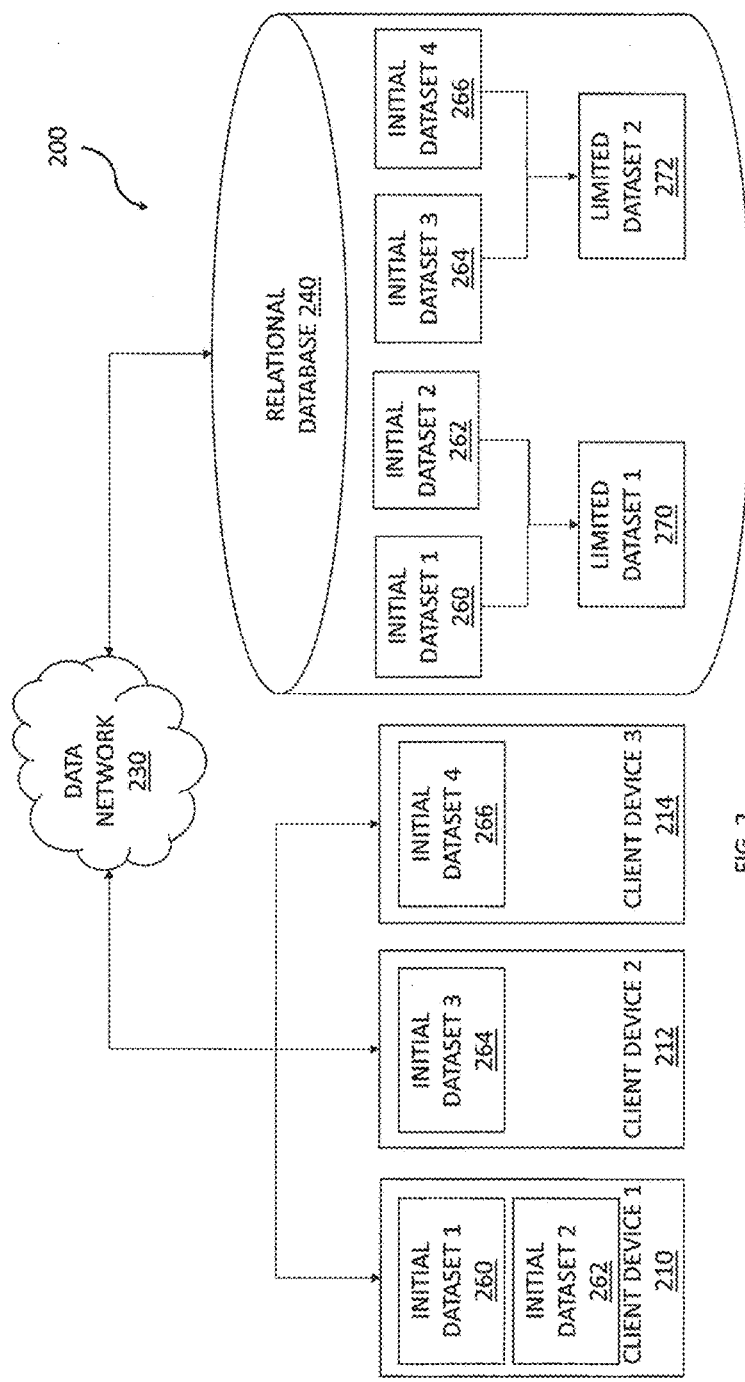
FIG. 2 is a block diagram of a system for selectively retrieving data from an initial dataset to provide a limited dataset, according to an example embodiment.

FIG. 2 is a block diagram of a system 200 for selectively retrieving data from initial datasets to provide limited datasets, according to one example embodiment.

As illustrated in FIG. 2, the system 200 generally includes a plurality of client devices 210, 212, 214, a data network 230, and a database 240. The computer processor of the client device 210, 212, 214 may be programmed to cause the client device 210, 212, 214 to transmit multiple initial datasets 260, 262, 264, 266 to a relational database 240. In one example, the computer processor of the client device (1) 210 may be programmed to cause the client device (1) to transmit two initial datasets 260, 262 to the relational database 240 so as to provide a limited dataset 270. The client device (2) 212 may be programmed to cause the client device (2) to transmit an initial dataset 264 to the relational database 240 such that at least a portion of the data of the initial dataset 264 is incorporated with another initial dataset 266, which is transmitted by a client device (3) 214. The data of the initial dataset 264 and the data of the initial dataset 266 may be aggregated or combined to provide a limited dataset 272.

The plurality of initial datasets 260, 262, 264, 266 may be transmitted to the relational database 240 via the plurality of different client devices 210, 212, 214. In some embodiments, the system 200 is drawn to the relational database 240 being programmed to combine or aggregate portions of data received from multiple initial datasets for providing multiple limited datasets.

Although not illustrated in FIG. 2, each of the client devices 210, 212, 214 may include the exemplary components of the client device 110 as illustrated in FIG. 1, but is not limited to such. The client devices 210, 212, 214 may include an application program, computer processor, random access memory, operating system, and permanent data storage. The computer processor may be programmed to execute commands or instructions via the application program to selectively retrieve data from the initial dataset to provide a limited dataset and/or incorporate the limited dataset into a pivot table. The application program may be implemented by the operating system of the client device. In other examples, the application program may be stored in a non-transitory computer-readable recordable medium. In another example, the software application may be a web-based application and stored on an external server or external database (not illustrated).

As shown in FIG. 2, the computer processor (not illustrated) of the relational database may be programmed to selectively retrieve data from the plurality of received separate initial datasets received 260, 262, 264, 266. In some embodiments, the relational database may be programmed to selectively retrieve data from the plurality of received separate initial datasets according to an application program. In some embodiments, the client devices 210, 212, 214 may be programmed to receive a combination of the limited datasets 270, 272. In one example, one or more of the client devices may not receive any of the limited datasets. In another example, one or more of the client devices may be programmed to receive some of or a portion of the limited datasets 270, 272. In another example, one or more of the client devices may be programmed to receive all of the limited datasets 270, 272 which were provided. The limited datasets received by the client devices may be further pivoted by a suitable application program, e.g., a database application program, of the client device to provide a pivot table.

In some embodiments, the initial datasets 260, 262, 264, 266 may be stored in a data storage unit (such as the data storage unit 150, FIG. 1). The limited datasets 270, 272 may be further stored in the data storage unit. In some embodiments, a portion of the datasets of the database 240 may be provided in the RAM of the database 240, e.g., to provide for quick retrieval. In some embodiments, a portion of the datasets of the database 240 may be stored in a web-based storage (e.g., cloud).

Figure 3:
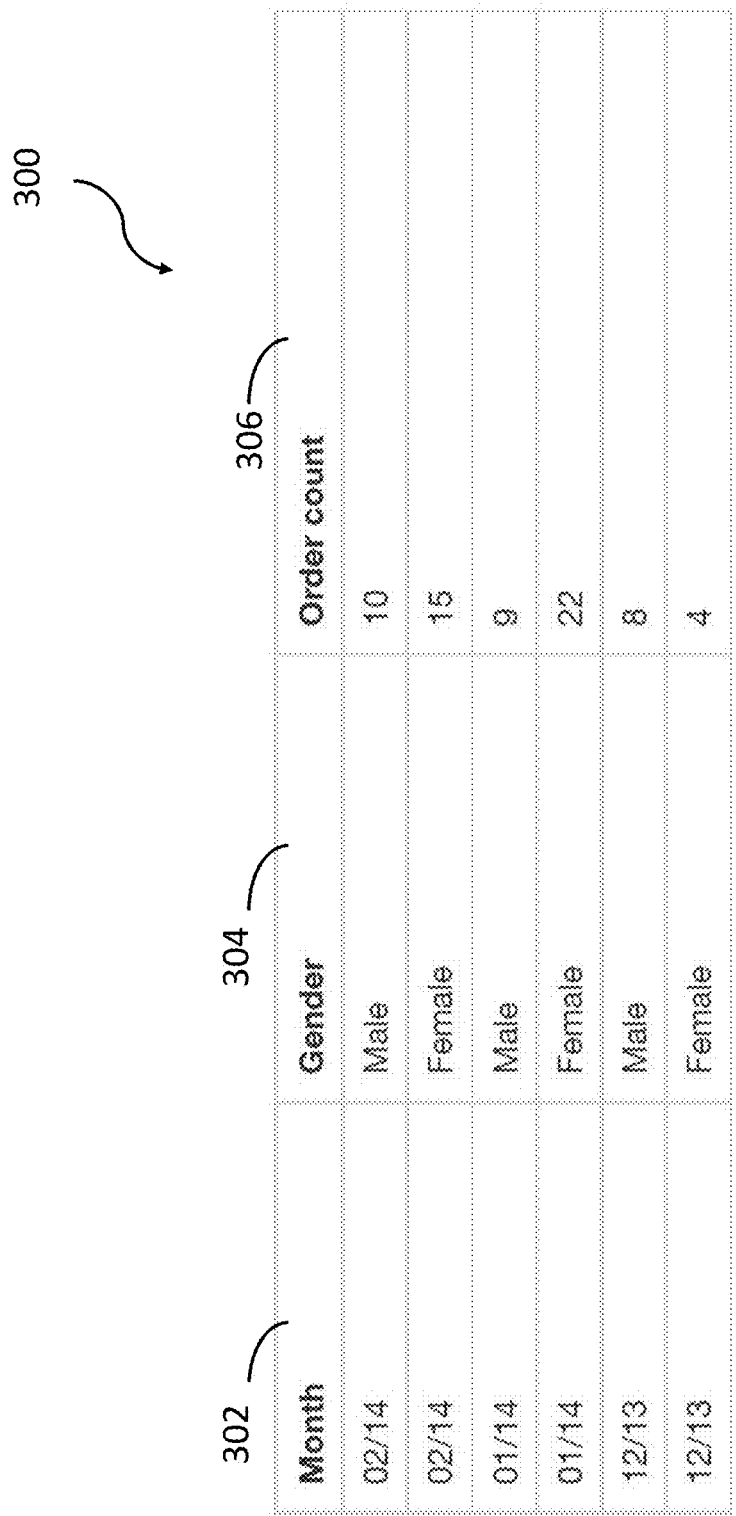
FIG. 3 is an example of an initial dataset, according to an example embodiment.

FIG. 3 is an initial dataset, according to one example. As illustrated in FIG. 3, the initial dataset 300 includes a grouping column 302 for "Month" including grouping values which are represented by different months of the year (i.e., 12/13, 1/14, and 2/14). The initial dataset further includes a partition column 304 for "Gender" including partition values which are represented by genders (Male, Female). The initial dataset further includes an ordering column 306 for "Order Count" including ordering values which are represented by different values. As illustrated in FIG. 3, each distinct row includes a corresponding grouping value, a corresponding partition value, and a corresponding ordering value. As shown in FIG. 3, the grouping column may include a separate grouping value (e.g., 02/14). As shown in FIG. 3, the partition column may include partition values (e.g., Male and Female) which are repeated in the rows in the initial dataset. See, e.g., FIG. 3 wherein for the initial dataset the partition column includes two occurrences of the "Male" value and three occurrences of the "Female" value.

Exclusive Approach

Figure 4:
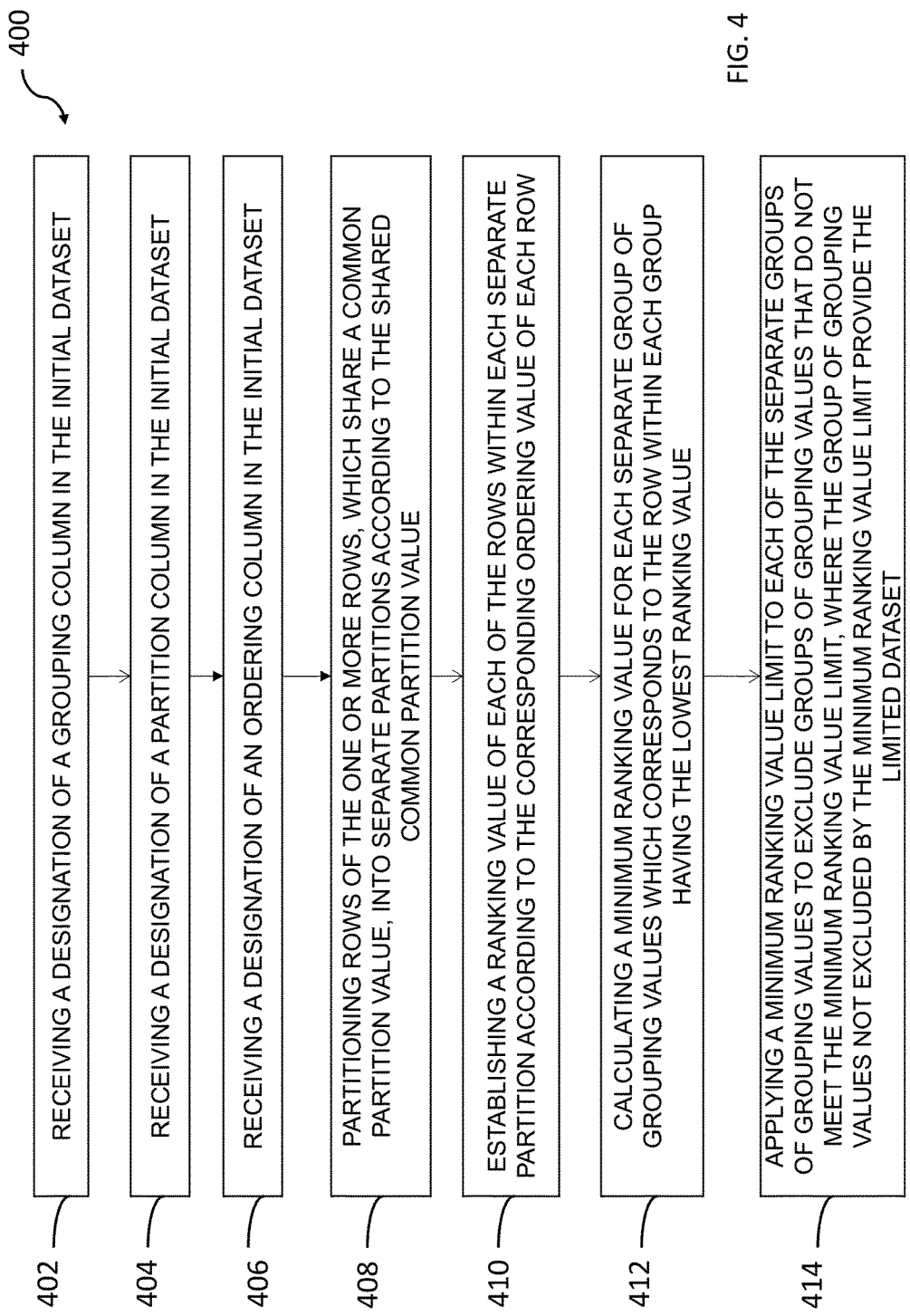
FIG. 4 is a flow diagram of a method for selectively retrieving data from an initial dataset to provide a limited dataset, according to an example embodiment.

FIG. 4 is a flow diagram of a method 400 for selectively retrieving data from an initial dataset to provide a limited dataset, according to an example embodiment. This example embodiment is illustrative of an embodiment of the Exclusive Approach of the present disclosure. In step 402, the database may receive a designation of a grouping column in the initial dataset, e.g., as designated by an application program. In some embodiments, the designation steps may be preceded by the database receiving commands or instructions from the application program to initiate the steps for executing the database application program.

In step 404, the database may receive a designation of a partition column in the initial dataset, e.g., as designated by the application program. In step 406, the database may receive a designation of an ordering column in the initial dataset, e.g., as designated by the application program.

In some embodiments, the designation of the grouping column, partition column, and ordering column may be manually designated by the user via the application program of the client device. In some embodiments, the designation of the grouping column, partition column, and ordering column may be automatically designated by the database application program included on the client device and/or the database.

Thereafter, in step 408, in response to the application program, the database may partition rows of the one or more rows of the initial dataset, which share a common partition value, into separate partitions according to the shared common partition value. For example, referring to FIG. 9A, the rows may be partitioned into separate partitions (p=1, 2, 3), where the rows within each partition include a shared common partition value.

In step 410, in response to the application program, the database may establish a ranking value of each of the rows within each separate partition according to the corresponding ordering value of each row. For example, referring to FIG. 9B, each of the rows within each separate partition (p=1, 2, 3) may be ranked according to each row's corresponding ordering value. The ranking value of each row may be designated by the column (_r). For example, the row a-1-100 may include a ranking value of 1 because it has the highest ordering value and the row c-1-5 may include a ranking value of 4 because it has the lowest ordering value. In some embodiments, the rows within each separate partition may be ranked according to an ascending order. In some embodiments, the rows within each separate partition may be ranked according to a descending order.

Thereafter, in step 412, in response to the application program, the database may calculate a minimum ranking value for each separate group of grouping values which corresponds to the row within each group having the lowest ranking value. In other examples, the ranking value of each group may correspond instead to a highest ranking value which corresponds to the row within each group having the highest ranking value.

Figures 9A, 9B, 9C, 9D:
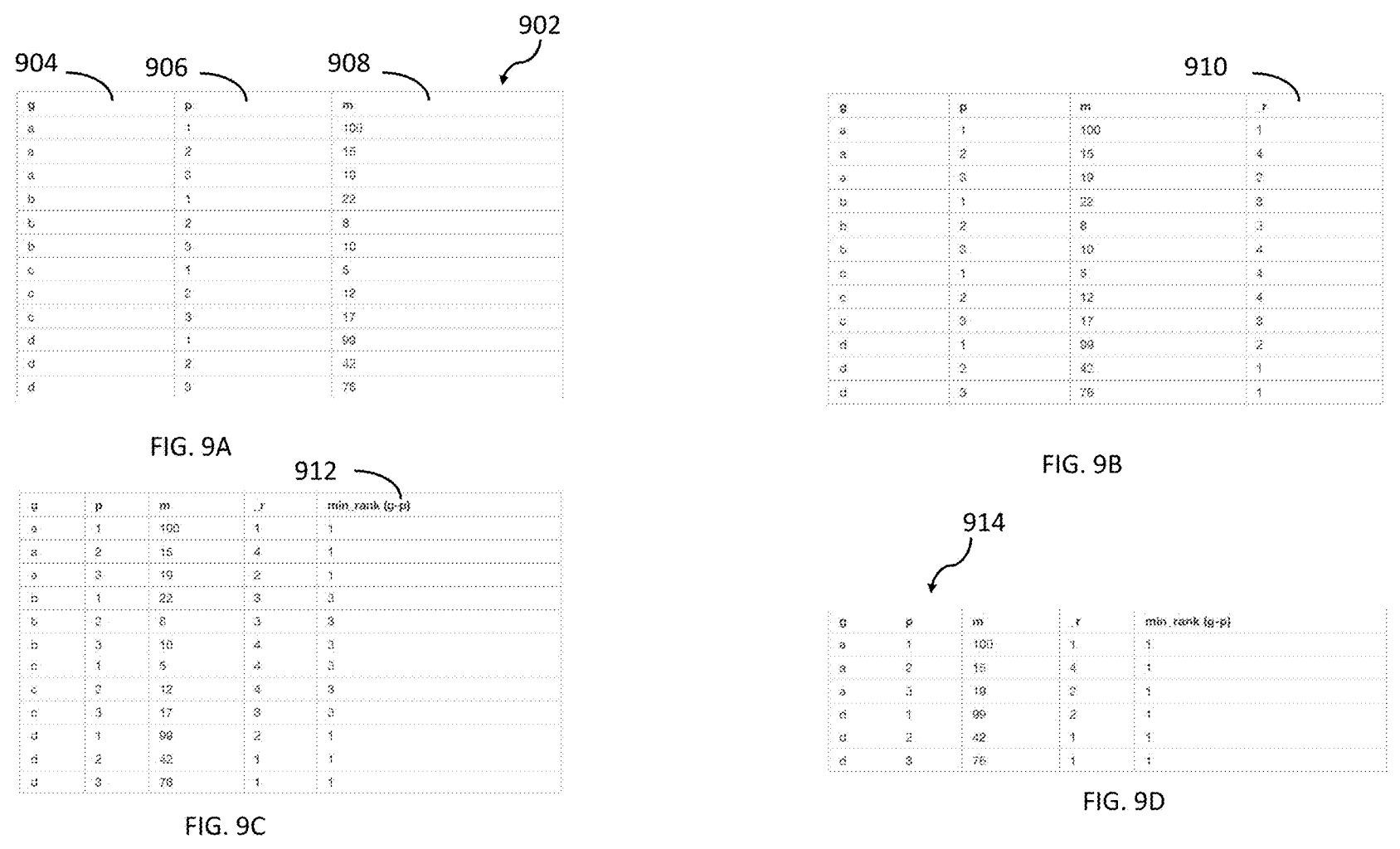

For example, referring to FIG. 9C, a distinct group (g=a) may have a minimum rank value of 1 because it includes a row having a ranking value of 1. A group (g=b) may have a minimum rank value of 3 because it includes the lowest ranking value of 3 in all of the rows within this group. As shown in FIG. 9C, the minimum ranking value is illustrated as column min_rank (g-p). In some embodiments, where the ranking value corresponds to the row within each group having the highest ranking value, the database may identify the row within each group having the highest ranking value.

The step of calculating a minimum rank value for each group in the initial data set may be executed with a SQL query. For example:

```
SELECT
    *,
    MIN(_r)
    OVER (PARTITION BY g) AS_min_rank
FROM (
    SELECT
    g,
    p,
    m,
    RANK ( )
    OVER ( )
    PARTITION BY p
    ORDER BY m DESC
    )    AS _r
    FROM test
    GROUP BY g, p, m
    ORDER BY m DESC
)AS x
WHERE _min_rank <=2
```

In step 414, in response to the application program, the database may apply a minimum ranking value limit to each of the separate groups of grouping values to exclude groups of grouping values that do not meet the minimum ranking value limit. In some embodiments, the group of grouping values not excluded by the minimum ranking value limit may provide a limited dataset. The database may apply a minimum ranking value limit which generally refers to establishing a minimum ranking value limit for each distinct group of grouping values. In some examples, the minimum ranking value limit may be in response to the row limit of the pivot table specified by the application program. For example, the database may be able to discern which rows of the initial dataset may need to be incorporated into the limited dataset such as to provide a pivot table with a row limit specified by the application program.

For example, referring to FIG. 9D, a minimum ranking value limit (not illustrated) of <=2 was applied to the separate groups of grouping values. Those separate groups that did not include a minimum ranking value where (min_ rank)<=2 were excluded from being provided to the limited dataset.

In some embodiments, the ranking value limit may be a number. It may also be a symbol, letter, or word. In some embodiments, the limit represents a threshold for excluding values that exceed the limit. In some embodiments, the limit represents a threshold for excluding values that exceed the limit or are equal to the limit value. In other examples, the limit represents threshold for excluding values that are below the limit value. In other examples, limit represents threshold for excluding values that are below or equal to the limit value.

Examples of SQL expressions which may be used to implement the steps recited in FIG. 4 to selectively retrieve data from initial datasets to provide limited datasets are provided below:

```
SELECT
    *,
    MIN(_r)
    OVER (PARTITION BY g) AS_min_rank
FROM (
    SELECT
    g,
    p,
    m,
    RANK ( )
    OVER ( )
    PARTITION BY p
    ORDER BY m DESC
    )    AS _r
    FROM test
    GROUP BY g, p, m
    ORDER BY m DESC
)AS x
WHERE _min_rank <=2
```

In some embodiments, when the limited dataset is provided by the application program it may thereafter be transmitted to the client device. Factors to be considered in determining whether the limited dataset is to be transmitted to the client device may include available memory cache in the client device, number of ongoing processes, file size of the limited dataset, and the availability of a data network to transmit the limited dataset.

Furthermore, a portion of the steps of FIG. 4 may be repeated for additional initial data sets to provide for additional limited datasets.

Figure 5:
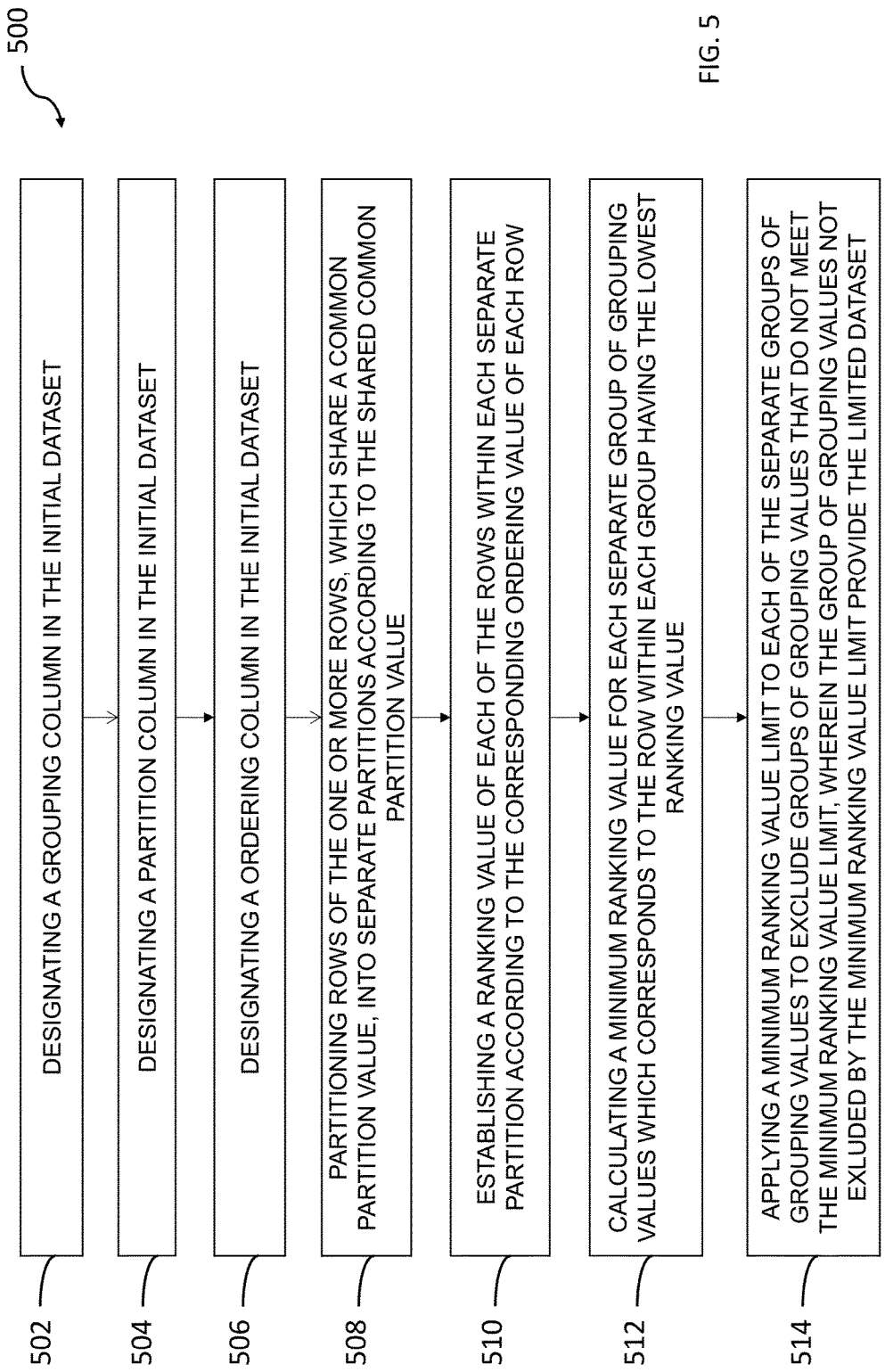
FIG. 5 is a flow diagram of a method for selectively retrieving data from an initial dataset to provide a limited dataset, according to an example embodiment.

FIG. 5 is a flow diagram of a method 500 for selectively retrieving data from initial datasets to provide a limited dataset, according to one example. In step 502, an application program may designate a grouping column in the initial dataset. In step 504, the application program may designate a partition column in the initial dataset. In step 506, the application program may further designate an ordering column in the initial dataset. In some embodiments, the designation steps may be preceded by the application program transmitting instructions or commands for executing the database application program.

In step 508, in response to the application program, the database may partition rows of the one or more rows of the initial dataset, which share a common partition value, into separate partitions according to the shared common partition value. For example, referring to FIG. 9A, the rows may be partitioned into separate partitions (p=1, 2, 3), where the rows within each partition include a shared common partition value.

In step 510, in response to the application program, the database may establish a ranking value of each of the rows within each separate partition according to the corresponding ordering value of each row. For example, referring to FIG. 9B, each of the rows within each separate partition (p=1, 2, 3) may be ranked according to each row's corresponding ordering value. The ranking value of each row may be designated by the column (_r). For example, the row a-1-100 may include a ranking value of 1 because it has the highest ordering value and the row c-1-5 may include a ranking value of 4 because it has the lowest ordering value. In some embodiments, the rows within each separate partition may be ranked according to an ascending order. In some embodiments, the rows within each separate partition may be ranked according to a descending order.

Thereafter, in step 512, in response to the application program, the database may calculate a minimum ranking value for each separate group of grouping values which corresponds to the row within each group having the lowest ranking value. In other examples, the ranking value of each group may correspond instead to a highest ranking value which corresponds to the row within each group having the highest ranking value.

For example, referring to FIG. 9C, a distinct group (g=a) may have a minimum rank value of 1 because it includes a row having a ranking value of 1. A group (g=b) may have a minimum rank value of 3 because it includes the lowest ranking value of 3 in all of the rows within this group. As shown in FIG. 9C, the minimum ranking value is illustrated as column min_rank (g-p). In some embodiments, where the ranking value corresponds to the row within each group having the highest ranking value, the database may identify the row within each group having the highest ranking value.

Thereafter, in step 514, in response to the application program, the database may apply a minimum ranking value limit to each of the separate groups of grouping values to exclude groups of grouping values that do not meet the minimum ranking value limit. In some embodiments, the group of grouping values not excluded by the minimum ranking value limit may provide a limited dataset. In response to the application program, the database may specify a minimum ranking value limit which generally refers to establishing a minimum ranking value limit for each distinct group of grouping values.

Inclusive Approach

Figure 6:
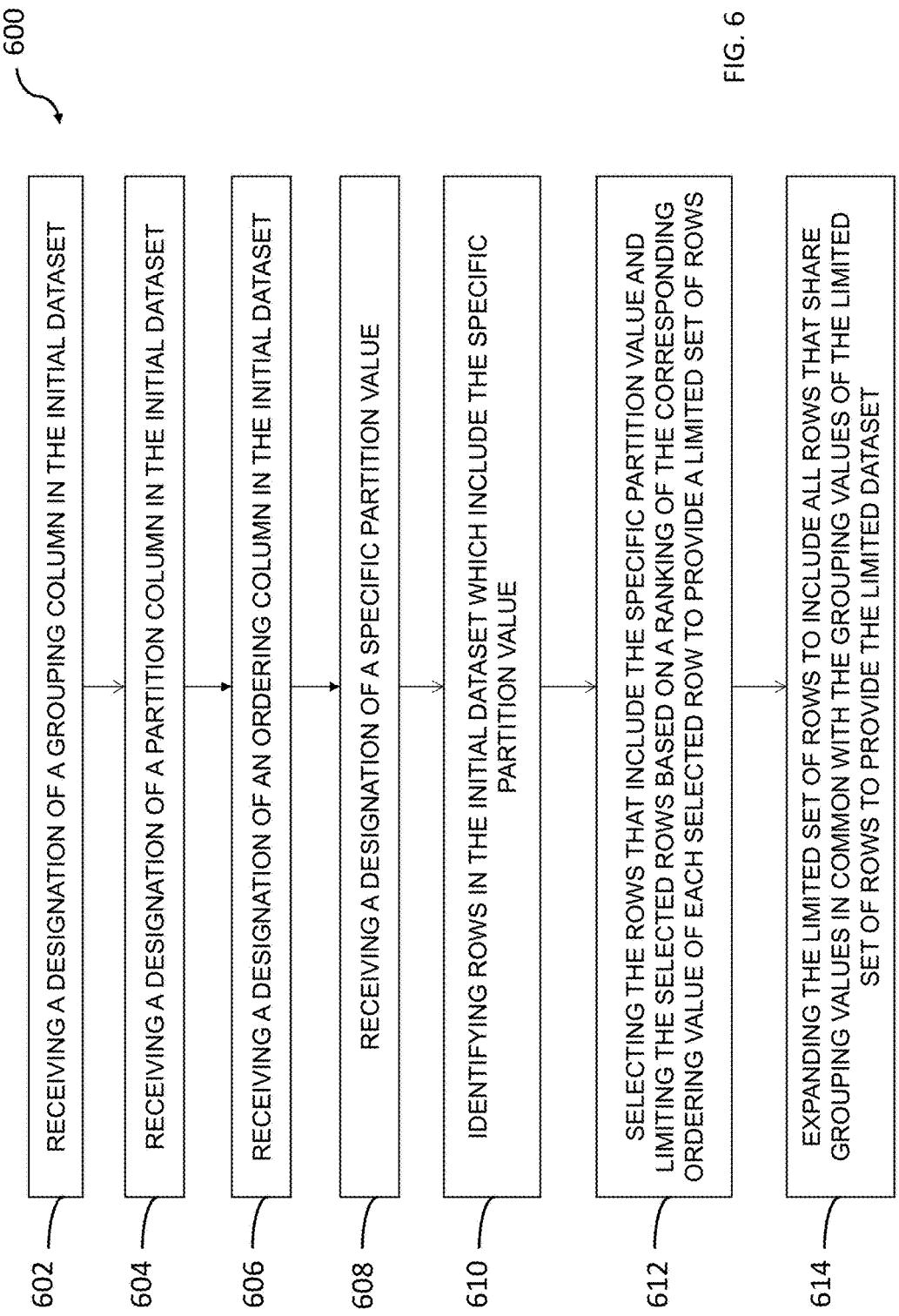
FIG. 6 is a flow diagram of a method for selectively retrieving data from an initial dataset to provide a limited dataset, according to an example embodiment.

FIG. 6 is a flow diagram of a method 600 for selectively retrieving data from an initial dataset to provide a limited dataset, according to one example. This example embodiment is illustrative of an embodiment of the Inclusive Approach of the present disclosure. In step 602, the database may receive a designation of a grouping column in the initial dataset, e.g., as designated by an application program. In some embodiments, the designation steps may be preceded by the database receiving commands or instructions from the application program to initiate the steps for executing the database application program.

In step 604, the database may receive a designation of a partition column in the initial dataset, e.g., as designated by the application program. In step 606, the database may receive a designation of an ordering column in the initial dataset, e.g., as designated by the application program.

In some embodiments, the designation of the grouping column, partition column, and ordering column may be manually designated by the user via the application program of the client device. In some embodiments, the designation of the grouping column, partition column, and ordering column may be automatically designated by the database application program included on the client device and/or the database.

In step 608, the application program may receive a designation of a specific partition value. For example, referring to FIG. 10A, a specific partition value (p=1) may be designated by the application program. In some embodiments, the application program may designate a specific partition value, which may be repeated in the initial dataset. However, in some embodiments, the designated partition value may not be repeated in the initial dataset. In such instances, the database application program may still partition the rows according the specified partition value even if it is not repeated.

Figures 10A, 10B, 10C, 10D:
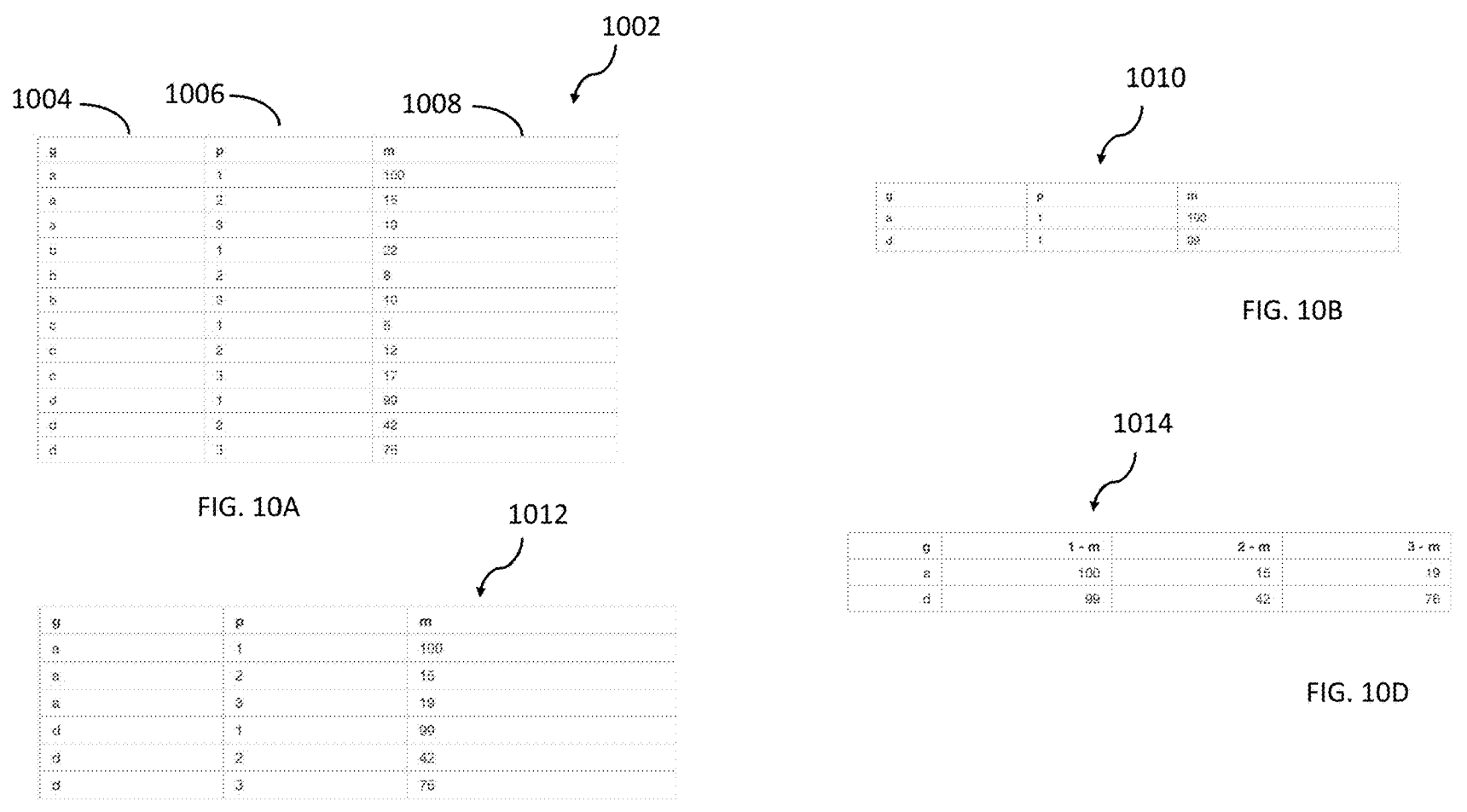

Thereafter, in step 610, in response to the application program, the database may identify the rows in the initial dataset that include the specific partition value. For example, referring to FIG. 10A, if a specific partition value (p=1) is designated then the database may identify only those rows in the initial dataset that include the specific partition value (p=1). In this example, as shown in FIG. 10A, there are four rows that include partition value of (p=1), a-1-100, b-1-22, c-1-5, and d-1-99.

Thereafter, in step 612, in response to the application program, the database may identify and select the rows in the initial dataset that include the specific partition value and limit the selected rows according to a ranking of the corresponding ordering value of each selected row to provide a limited set of rows. For example, in response to the application program, the database may select only rows that include the specified partition value and rank those rows according to their corresponding ordering values.

For example, the application program may be programmed to designate a row limit. By designating a row limit, in response to the application program, the database may restrict the number of rows to be provided in the limited dataset that include the specific partition value according to a specified row limit. In some embodiments, the row limit may also designate a minimum number of rows to be included in the limited set of rows. For example, a row limit of 2 specifies that two rows must be included in the limited set of rows.

In some examples, the application program may also be programmed to designate the row limit of the pivot table. As a result of receiving a designation of a row limit of the pivot table, the database may determine which rows are required in order to fill in the pivot table. In some examples, the initial dataset may not be able to fit within the physical limits of the memory of the application program. As a result, the application program may specify a specified number of rows to be included in the pivot table, which may be transmitted to the database as a command. Thereafter, the database may selectively retrieve data from the initial dataset in order to provide a limited dataset in order to fulfill the application program's request for a pivot table including a specified number of rows.

For example, referring to FIG. 10B, in response to the application program, the database may identify all the rows that include a specific partition value (p=1) and thereafter, rank all the rows included in the partition (p=1) according to the corresponding ordering value of each row. In response to the application program, the database may provide a limited set of rows by restricting the number of rows that include the specific partition value according to the ranking value of each row and limit the rows to be provided in the limited set of rows according to the designated row limit. For example, the application program may specify a row limit of 2. Therefore, rows a-1-100 and d-1-99 are the two rows in this partition having the highest ordering values, and represent an example of a limited set of rows.

The application program creates a SQL expression to be received and processed by the database, according to some examples. For example, the application program may specify a row limit, which may be transmitted to the database. In one example, the SQL expression may be LIMIT SQL, to specify a row limit In some embodiments, after applying the row limit, the database may not be able to yield sufficient rows that include the specific partition value and still meet the specified row limit. In such an instance, in response to the application program, the database may selectively retrieve additional rows that may not include the specific partition value to provide the limited dataset. In some embodiments, the application program may specify a LEFT JOIN or RIGHT JOIN SQL expression to query for this result.

Furthermore, the database may further receive a SQL expression to ORDER ranking of the rows. In some embodiments, the SQL expression for the order ranking is ORDER BY m DESC. In one example, if the ORDER BY m DESC and LIMIT 2 SQL expressions are utilized, then the database program limits the number of rows that are selectively retrieved from the initial datasets to populate a limited dataset to include only the two rows that include the top two corresponding ordering values.

In step 614, in response to the application program, the database may expand the limited set of rows to include all rows that share grouping values in common with the grouping values of the limited set of rows to provide the limited dataset. For example, referring to FIG. 10C, the database previously identified that the two rows included in the limited set of rows have grouping values of (a, d). Therefore, the database may identify all rows in the initial dataset that include a grouping value of a or d, and expand the limited set of rows to further include these rows which include a grouping value in common with the limited set of rows as shown in FIG. 10C.

Exemplary SQL expressions for executing the steps of FIG. 6 are provided below:

```
SELECT results.*
FROM (
    --join to filter our results down to the 'p' value
    -- from our pivot sort column, then apply the sort
    -- and limit, to identify the g values we will return
    (
    SELECT pivot_join.*
    FROM
        (
        SELECT p
        FROM test
        GROUP BY p
        ORDER BY p
        LIMIT 1
        )AS pivot_cols JOIN
        (
        SELECT
            g,
            p,
            m
        FROM test
        ) AS pivot_join ON pivot_join.p = pivot_cols.p
        ORDER BY m DESC -- the desired pivot sort
        LIMIT 2 -- the desired row limit
        )
    ) AS pivot_info
    -- join back to the full table to fill in any missing m values
    -- for the selected g values
    JOIN (
        SELECT
            g,
            p,
            m
    FROM test
    ) AS results ON pivot_info.g = results.g
```

Figure 7:
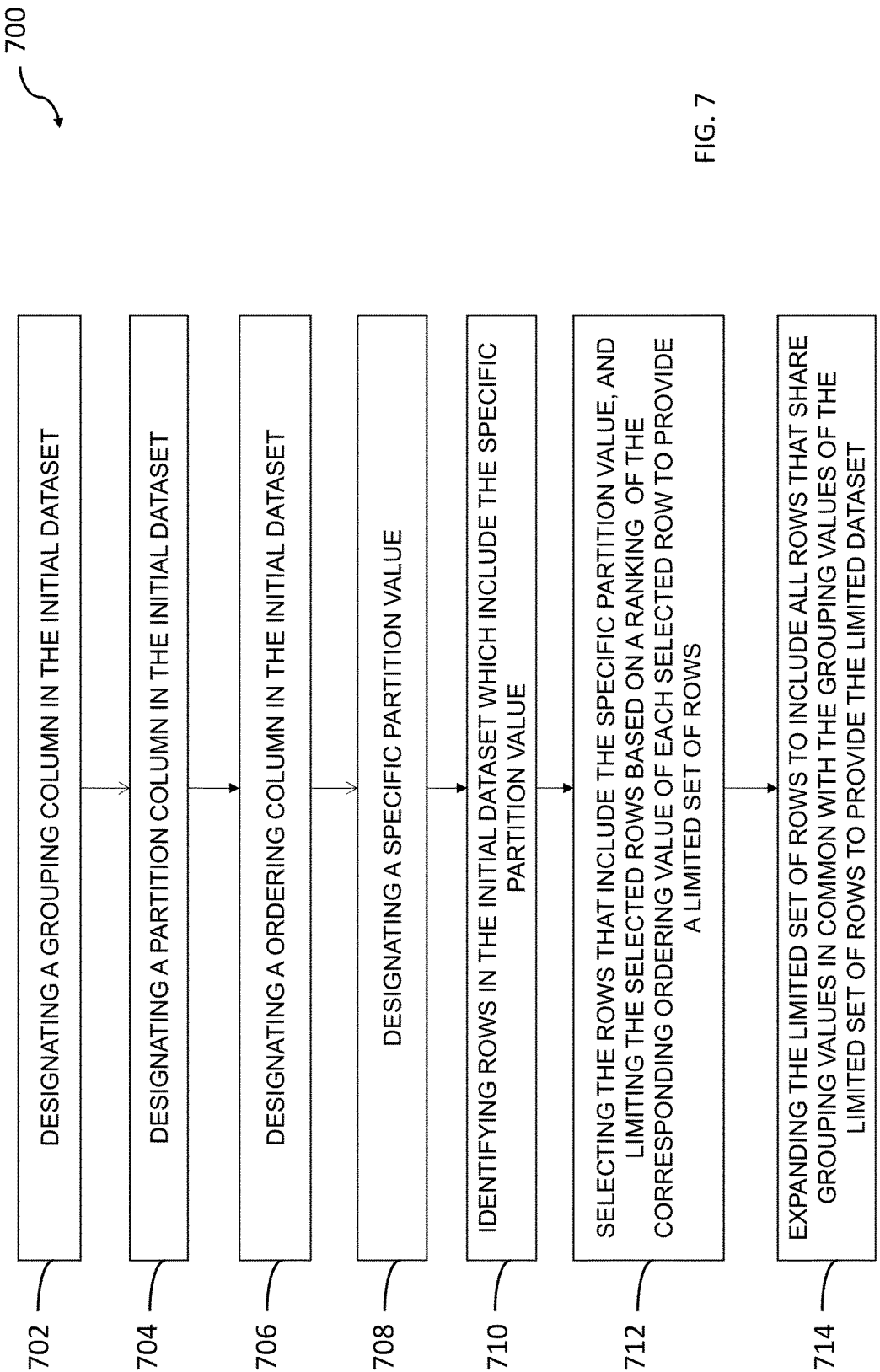
FIG. 7 is a flow diagram of a method for selectively retrieving data from an initial dataset to provide a limited dataset, according to an example embodiment.

FIG. 7 is a flow diagram of a method 700 for selectively retrieving data from an initial dataset to provide a limited dataset, according to one example.

In step 702, an application program may designate a grouping column in the initial dataset. In step 704, the application program may designate a partition column in the initial dataset. In step 706, the application program may designate an ordering column in the initial dataset. In some embodiments, the designation steps may be preceded by the application program transmitting instructions or commands for executing the database application program. In step 708, the application program may further designate a specific partition value. In some embodiments, the application program may designate a specific partition value; however, in some embodiments, the designated partition value may not be repeated in the initial dataset. In such instances, the database application program may still partition the rows according the specified partition value even if it is not repeated.

Thereafter, in step 710, in response to the application program, the database may identify the rows in the initial dataset that include the specific partition value. For example, referring to FIG. 10A, if a specific partition value (p=1) is designated then the database may identify only those rows in the initial dataset that include the specific partition value (p=1). In this example, as shown in FIG. 10A, there are four rows that include partition value of (p=1), a-1-100, b-1-22, c-1-5, and d-1-99.

Thereafter, in step 712, in response to the application program, the database may identify and select the rows in the initial dataset that include the specific partition value and limit the selected rows according to a ranking of the corresponding ordering value of each selected row to provide a limited set of rows. For example, in response to the application program, the database may select only rows that include the specified partition value and rank those rows according to their corresponding ordering values.

For example, the application program may be programmed to designate a row limit. By designating a row limit, the application program may be programmed to restrict the number of rows to be provided in the limited dataset that include the specific partition value according to a specified row limit. In some embodiments, the row limit may also designate a minimum number of rows to be included in the limited set of rows. For example, a row limit of 2 specifies that two rows must be included in the limited set of rows.

For example, referring to FIG. 10B, in response to the application program, the database may identify all the rows that include a specific partition value (p=1) and thereafter, rank all the rows included in the partition (p=1) according to the corresponding ordering value of each row. In response to the application program, the database may provide a limited set of rows by restricting the number of rows that include the specific partition value according to the ranking value of each row and limit the rows to be provided in the limited set of rows according to the designated row limit. For example, the application program may specify a row limit of 2. Therefore, rows a-1-100 and d-1-99 are the two rows in this partition having the highest ordering values, and represent an example of a limited set of rows.

In step 714, in response to the application program, the database may expand the limited set of rows to include all rows that share grouping values in common with the grouping values of the limited set of rows to provide the limited dataset. For example, referring to FIG. 10C, the previously identified that the two rows included in the limited set of rows have grouping values of (a, d). Therefore, the database may identify all rows in the initial dataset that include a grouping value of a or d, and expand the limited set of rows to further include these rows which include a grouping value in common with the limited set of rows as shown in FIG. 10C.

Once the expanded number of rows is retrieved in the limited dataset, the database application program on the client device may be configured to pivot or rearrange the limited dataset to form a pivot table. For example, refer to FIG. 10D, which illustrates a pivot table 1014 of the limited dataset 1012 shown in FIG. 10C.

In some embodiments, the values in the initial dataset may be incomplete or unsatisfactory for providing a limited dataset. For example, one or more of the grouping, partitioning, or ordering values of the initial dataset may be incomplete. Such values may be represented by a null value or a 0 value. In this instance, the application program may still be configured to perform the steps for selectively retrieving the data from the initial dataset regardless of the fact that the data may be incomplete by executing a SQL query using RIGHT JOIN or LEFT JOIN commands. An example of SQL expressions which may be utilized is provided below:

```
SELECT results.*
FROM (
    --join to filter our results down to the
    "SORTED_PIVOT_VALUE",
    -- then apply the sort and limit to identify the g values
    -- we will return
    (
    SELECT pivot_join.*
    FROM
        (
        SELECT p
        FROM test
        GROUP BY p
        ORDER BY p
        LIMIT 1
        )AS pivot_cols JOIN
    --right join to pad our results to the limit if needed
    RIGHT JOIN(
        SELECT
            g,
            p,
            m
        FROM test
        ) AS pivot_join ON pivot_join.p = pivot_cols.p
        ORDER BY m DESC -- the desired pivot sort
        LIMIT 2 -- the desired row limit
        )
    ) AS pivot_info
-- join back to the full table to fill in any missing m values
-- for the selected g values
JOIN (
    SELECT
        g,
        p,
        m
    FROM test
    ) AS results ON pivot_info.g = results.g
    --join to our pivots again to limit the columns
    LEFT JOIN (
        SELECT
        p
        FROM test
        GROUP BY p
        ORDER BY p
        LIMIT 2
        ) AS column _limiter on results.p = column_limiter.p
    where column_limiter.p is not null
```

As such, using the above SQL query expressions, the application program may cause the database to fill in a limited dataset according to a row limit of 2, even where there are missing corresponding ordering values for selected groups of grouping values.

Populating a Pivot Table with a Limited Dataset

Figure 8:
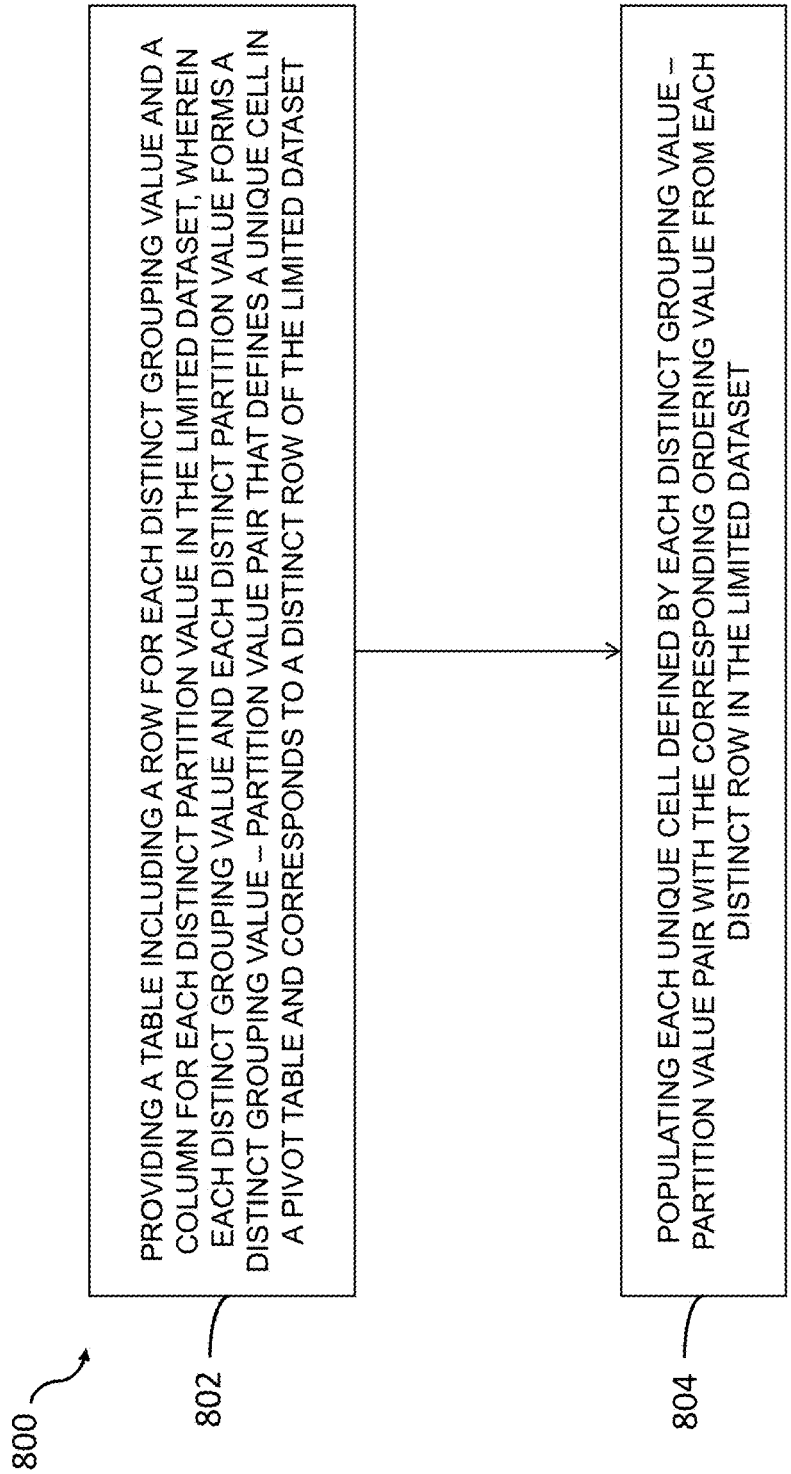
FIG. 8 is a flow diagram of a method for pivoting a limited dataset, according to an example embodiment.

FIG. 8 illustrates a method 800 for populating a pivot, according to one example. The limited dataset may be provided via any one or more of the methods described herein.

In step 802, the application program may provide a table comprising a row for each distinct grouping value and a column for each distinct partition value in the limited dataset where each distinct grouping value and each distinct partition value forms a distinct grouping value-partition value pair that defines a unique cell in a pivot table and corresponds to a distinct row of the limited dataset. An example of the pivot step is illustrated in FIG. 10D. FIG. 10D illustrates that a limited dataset 1012 may be pivoted to provide a pivot table 1014. In this example, in FIG. 10D, two rows are provided in the pivot table, where each row represents a distinct grouping value (a, d). Furthermore, in this example, three columns are provided that represent each distinct partition value (1, 2, 3). For example, the grouping value (g=a) and the partition value (p=1) form a distinct grouping value-partition value pair (a-1) that defines a unique cell in the pivot table. Each unique cell defined by each distinct grouping value-partition value pair may then be populated with the corresponding ordering value for each distinct row. In this example, the unique cell of the distinct grouping value—partition value pair (a-1) is populated with the corresponding ordering value 100.

An example of the pivot step is shown in one example illustrated in FIG. 10D. FIG. 10D illustrated in step 804, the application program may populate each unique cell of the table by defining each distinct grouping value-partition value pair with the corresponding ordering value from each distinct row in the limited dataset. In some embodiments, the application program may be programmed to populate each unique cell of the table for every distinct grouping value-partition value pair until all cells of the table are populated with the corresponding ordering value from each distinct row in the limited dataset.

In some embodiments, pivoting the limited dataset to provide a pivot table may occur immediately after providing the limited dataset. In other examples, there may be a delay between providing a limited dataset and thereafter pivoting the limited dataset to provide a pivot table. Referring to FIG. 10D, the limited dataset 1012 may be pivoted to provide a pivot table 1014. The pivot table provides a table comprising a row for each distinct grouping value and a column for each distinct partition value in the limited data set, where each distinct grouping value and each distinct partition value form a distinct grouping value-partition value pair that defines a unique cell in the pivot table and corresponds to a distinct row of the limited dataset.

As discussed previously herein, FIGS. 9A-D illustrate examples of datasets of a method for selectively retrieving data from an initial dataset to provide a limited dataset, according to an example embodiment of an Exclusive Approach.

FIG. 9A illustrates an initial dataset 902 including a grouping column 904, a partition column 906, and an ordering column 908. The grouping column 904 includes grouping values. The partition column 906 includes partition values, represented by distinct partitions (p=1, 2, or 3). The distinct partition values may also be repeated in the initial dataset. The ordering column 908 includes ordering values. The grouping column includes separate groups of grouping values, represented as separate groups (g=a, b, c, or d)

FIG. 9B illustrates the step of determining the ranking value (_r). In this example, the ranking value (_r) represents the rank of the rows included within each separate partition. For example, each partition includes all rows that share a partition value in common. In this example, the groups are separated by a partition value according to p=1, 2, or 3. In this example, the ranking value is determined for each row included within each partition according to the corresponding ordering value of each row. For instance, the partition (p=1) includes the following rows: a-1-100, b-1-22, c-1-5, and d-1-99. Separately, partition (p=2) includes the following rows: a-2-15, b-2-8, c-2-12, and d-2-42. Partition (p=3) includes the following rows: a-3-19, b-3-10, c-3-17, and d-3-76.

In the example illustrated in FIG. 9B, a ranking value is determine based on an ascending order of ordering values. For example, each row included within each distinct partition is ranked respectively to the other rows included within the same partition. For example, the row a-1-100 has a rank value of 1, the row d-1-99 has a rank value of 2, the row b-1-22 has a rank value of 3, and the row c-1-5 has a rank value of 4. The initial dataset in FIG. 9B may further include an additional ranking value (_r) column 910 added to the initial dataset, which includes one or more ranking values.

FIG. 9C illustrates that a min_rank is established for each group of grouping values. For example, referring to the group (a), the min_rank of the group is 1 because the lowest minimum rank (_r) of all the rows included within the group is r=1. In another example, referring to the group (b), the min_rank is 3 because the lowest minimum rank (_r) of all the rows included within the group (b) is _r=3. FIG. 9C illustrates that the initial dataset may further include an additional min_rank column 912 added to the initial dataset, where the min_rank column 912 includes one or more minimum rank values.

FIG. 9D illustrates a limited dataset 914 after selectively retrieving the data from the initial dataset. In this example, prior to providing a limited dataset, the database may designate a minimum rank value limit. For example, the database may exclude all groups of grouping values having a min_rank value which is greater than or equal to 2 (i.e., x≥2). Accordingly, all groups having a min_rank value greater than or equal to 2 will be excluded from being provided in the limited dataset. Accordingly, because only groups (a) and (d) include min_rank values less than 2, only those groups will be provided in the limited dataset. Furthermore, the limited dataset 914 may then be pivoted via the application program to provide a pivot table including only as many rows as specified by the application program. For example, if the application program specified a row limit of 2, then the resulting pivot table will be limited to two rows.

As discussed previously herein, FIGS. 10A-D illustrate examples of datasets of a method for selectively retrieving data from an initial dataset to provide a limited dataset, according to an example embodiment of an Inclusive Approach.

FIG. 10A illustrates an initial dataset 1002 includes a grouping column 1004, a partition column 1006, and an ordering column 1008. The grouping column 1004 includes grouping values. The partition column 1006 includes partition values, including repeating partition values, represented by distinct partitions (p=1, 2, or 3). The ordering column 1008 includes ordering values. The grouping column 1004 includes separate groups of grouping values, represented as separate groups (g=a, b, c, or d). Although not illustrated in FIG. 10A, the application program may designate a specific partition value. In this example, the application program has designated a specific partition value of p=1.

FIG. 10B illustrates the identification and selection of those rows in the initial dataset which include the specific partition value of (p=1). The selected row including the specific partition value may be further limited to provide a limit set of rows including the specified partition value. For example, the number of rows provided in the limited set of rows may be determined by the application program designating a row limit. In order to obtain the desired row limit, the computer processor of the database may be programmed to rank the selected rows including the specific partition value according to each row's corresponding ordering value. Accordingly, the application program may restrict the number of selected rows according to the corresponding ordering value of each row.

For example, using a SQL expression, the application program may designate a row limit:

---
ORDER BY m DESC -- the desired pivot sort
LIMIT 2
---

As shown in FIG. 10B, a row limit of 2 has been specified. Thereafter, in response to the application program, the database has provided the limited set of rows a-1-100 and d-1-99 by limiting the number of rows to be provided in the limited set of rows to include only those two rows having the two highest ordering values. Accordingly, because a-1-100 and d-1-99 have the two highest ordering values, they will be output in descending order. FIG. 10B represents a virtual or intermediate dataset 1010, which would represent the rows of the limited set of rows if it were to be displayed to the user.

FIG. 10C illustrates the limited dataset 1012 as a result of the database expanding the limited set of rows to include all the rows in the initial dataset that included the grouping values in common with the grouping values of the limited set of rows. As described with reference to FIG. 10B, the database identified two groups (a, g); therefore, the database identifies all of the rows in the initial dataset including the grouping values (a, g).

Referring to FIG. 10D, the limited dataset 1012 may be further pivoted to provide a pivot table 1014. The pivot table provides a table comprising a row for each distinct grouping value and a column for each distinct partition value in the limited data set, where each distinct grouping value and each distinct partition value form a distinct grouping value-partition value pair that defines a unique cell in the pivot table and corresponds to a distinct row of the limited dataset. In this example, two rows are provided in the pivot table, where each row represents a distinct grouping value (a, d). Furthermore, in this example, three columns are provided that represent each distinct partition value (1, 2, 3). For example, the grouping value (g=a) and the partition value (p=1) form a distinct grouping value-partition value pair (a-1) that defines a unique cell in the pivot table. Each unique cell defined by each distinct grouping value-partition value pair may then be populated with the corresponding ordering value for each distinct row. In this example, the unique cell of the distinct grouping value-partition value pair (a-1) is populated with the corresponding ordering value 100.

The pivot table 1014 includes only as many rows as specified by the application program. For example, if the application program specified a row limit of 2, then the resulting pivot table may only include two rows.

Figure 11:
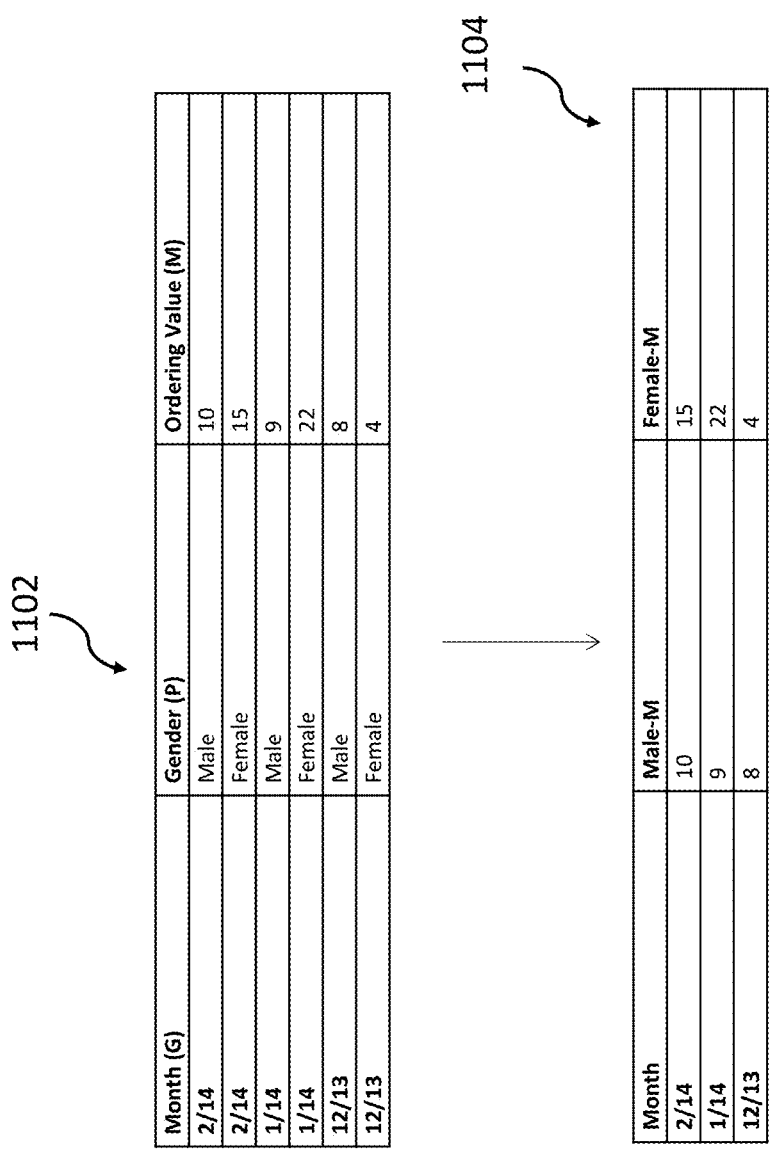
FIG. 11 is a dataset of a method for pivoting a limited dataset to provide a pivot table, according to an example embodiment.

FIG. 11 illustrates one example of pivoting a limited dataset to provide a pivot table. For example, FIG. 11 illustrates pivoting a limited dataset 1102 to provide a pivot table 1104. In this example, three rows are provided in the pivot table, where each row represents a distinct grouping value (2/14, 1/14, 12/13). Furthermore, in this example, two columns are provided that represent each distinct partition value (Male, Female). For example, the grouping value (g=2/14) and the partition value (p=Male) form a distinct grouping value-partition value pair (2/14-M) that defines a unique cell in the pivot table. Each unique cell defined by each distinct grouping value-partition value pair may then be populated with the corresponding ordering value for each distinct row. In this example, the unique cell of the distinct grouping value-partition value pair (2/14-M) is populated with the corresponding ordering value 10.

FIG. 11 may represent a limited dataset in response to an exemplary query by a user: "How many total male customers have placed an order?" With a handful of data in a small initial dataset, the user may be able to determine the answer simply by looking at the tables. However, where there is a significant amount of data in the initial dataset, it may be more difficult to determine the answer to the posed question. However, using the limited dataset, the user may be able to more readily determine an answer to the posed question: that 8 male customers placed orders during December, 9 male customers placed orders during January, and 10 male customers placed orders during February.

FIG. 12 provides an example of a SQL implemented method for selectively retrieving data from an initial dataset to provide a limited dataset, according to an example embodiment. As shown in FIG. 12, the database application program may specify a partition column ('PARTITION BY p') and an ordering column ('ORDER BY m DESC'). Furthermore, 'ORDER BY m DESC' makes clear that determining the ranking of the rows within each partition will be determined based on a descending value of the ordering values within each partition. Furthermore, the SQL expression 'WHERE _min_rank<=2' may specify that the minimum ranking value limit is where the minimum ranking value is less than or equal to 2. For instance, the database will not incorporate those partitions having a minimum ranking value less than or equal to 2.

FIG. 13 provides an example of a SQL implemented method for selectively retrieving data from an initial dataset to provide a limited dataset, according to another example embodiment. As shown in FIG. 13, a specified partition value may be designated by the application program using SQL expression 'SELECT p'. Furthermore, the application program may specify a row limit using the SQL expression 'LIMIT 1'. The database application program may specify a partition column ('PARTITION BY p') and an ordering column ('ORDER BY m DE S C'). In some embodiments, the values in the initial dataset may be incomplete or unsatisfactory for providing a limited dataset. For example, one or more of the ordering, sorting, or ordering values of the initial dataset may be incomplete. Such values may be represented by a null value or a 0 value. In this instance, the database may still perform the steps for selectively retrieving the data from the initial dataset regardless of the fact that the data may be missing by executing a SQL query using RIGHT JOIN or LEFT JOIN expressions.

Although the foregoing invention has been described in some detail by way of illustration and example for purposes of clarity of understanding, it should be readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A computer-implemented method for selectively retrieving data from an initial dataset in a relational database to provide a limited dataset for incorporation into a pivot table, the method comprising the following steps performed by one or more computer processors of a computer:
   a. receiving in a user interface to a database application program executing in the computer, a designation of a grouping column in the initial dataset, wherein the grouping column comprises one or more groups of grouping values;
   b. receiving in the user interface a designation of a partition column in the initial dataset, wherein the partition column comprises one or more partition values;
   c. receiving in the user interface a designation of an ordering column in the initial dataset, wherein the ordering column comprises one or more ordering values, and wherein the initial dataset comprises one or more rows, wherein each row comprises a corresponding grouping value, a corresponding partition value, and a corresponding ordering value;
   d. receiving in the user interface a designation of a specific partition value;
   e. identifying rows in the initial dataset which comprise the specific partition value;
   f. selecting the rows that include the specific partition value, and limiting the selected rows based on a ranking of the corresponding ordering value of each selected row to provide a limited set of rows;
   g. expanding the limited set of rows to include all rows that share grouping values in common with the grouping values of the limited set of rows to provide the limited dataset;
   h. retrieving from memory, a designated row limit, and on condition that a number of rows in the expanded ones of the limited ones of the selected rows exceed the row limit, reducing a number of rows in the expanded ones of the limited ones of the selected rows to cause the number of rows to meet the designated row limit, but on condition that the number of rows in expanded ones of the limited ones of the selected rows falls short of the row limit, inserting additional rows of a different partition value into the expanded ones of the limited ones of the selected rows until the number of rows is equivalent to the designated row limit;
   i. inserting the expanded ones of the limited ones of the selected rows into a pivot table comprising a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset, by populating each cell defined by each distinct grouping value-partition value pair with the corresponding ordering value from each distinct row in the limited dataset, and, j. displaying the pivot table in the user interface to the database application program.

2. The method of claim 1, wherein the ranking of the corresponding ordering value of each selected row is based on either an ascending order or a descending order.

3. The method of claim 1, wherein the steps of receiving a designation of a grouping column, a partition column, and an ordering column in the initial dataset are repeated for additional initial datasets in the relational database.

4. The method of claim 1, wherein a JOIN SQL expression is executed to perform one or more of the steps performed by the one or more computer processors.

5. The method of claim 1, comprising executing an OFFSET SQL expression to sort for other partition values included in the partition column.

6. The method of claim 1, comprising executing a LIMIT SQL expression to limit the partition values included in the partition column.

7. The method of claim 1, further comprising transmitting the limited dataset to an application program included on a client device.

8. The method of claim 1, wherein the step of limiting the selected rows based on a ranking of the corresponding ordering value of each selected row comprises executing a RIGHT JOIN SQL expression to selectively retrieve additional rows that do not comprise the specific partition value to provide the limited dataset.

9. he method of claim 1, wherein the step of limiting the selected rows based on a ranking of the corresponding ordering value of each selected row comprises executing a LEFT JOIN SQL expression to selectively retrieve additional rows that do not comprise the specific partition value to provide the limited dataset.

10. A non-transitory computer-readable recording medium for selectively retrieving data from an initial dataset in a relational database to provide a limited dataset for incorporation into a pivot table comprising instructions, which, when executed by one or more processors, cause the one or more processors of a computer to:

a. receive a designation of a grouping column in the initial dataset, wherein the grouping column comprises one or more groups of grouping values;
  b. receive a designation of a partition column in the initial dataset, wherein the partition column comprises one or more partition values;
  c. receive a designation of an ordering column in the initial dataset, wherein the ordering column comprises one or more ordering values, and wherein the initial dataset comprises one or more rows, wherein each row comprises a corresponding grouping value, a corresponding partition value, and a corresponding ordering value;
  d. receive a designation of a specific partition value;
  e. identify rows in the initial dataset which comprise the specific partition value;
  f. select the rows that include the specific partition value, and limit the selected rows based on a ranking of the corresponding ordering value of each selected row to provide a limited set of rows;
  g. expand the limited set of rows to include all rows that share grouping values in common with the grouping values of the limited set of rows to provide the limited dataset;
  h. retrieve from memory of the computer a designated row limit, and on condition that a number of rows in the expanded ones of the limited ones of the selected rows exceed the row limit, reduce a number of rows in the expanded ones of the limited ones of the selected rows to cause the number of rows to meet the designated row limit, but on condition that the number of rows in expanded ones of the limited ones of the selected rows falls short of the row limit, insert additional rows of a different partition value into the expanded ones of the limited ones of the selected rows until the number of rows is equivalent to the designated row limit;
  i. insert the expanded ones of the limited ones of the selected rows into a pivot table comprising a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset, by populating each cell defined by each distinct grouping value-partition value pair with the corresponding ordering value from each distinct row in the limited dataset, and,
  j. display the pivot table in a user interface to a database application program.

11. A computer-implemented method for selectively retrieving data from an initial dataset in a relational database to provide a limited dataset for incorporation into a pivot table, the method comprising the following steps performed by one or more computer processors:

a. receiving a designation of a grouping column in the initial dataset, wherein the grouping column comprises one or more groups of grouping values;
  b. receiving a designation of a partition column in the initial dataset, wherein the partition column comprises a plurality of partition values comprising one or more partition values;
  c. receiving a designation of an ordering column in the initial dataset, wherein the ordering column comprises one or more ordering values, and wherein the initial dataset comprises one or more rows, wherein each row comprises a corresponding grouping value, a corresponding partition value, and a corresponding ordering value;
  d. partitioning rows of the one or more rows, which share a common partition value, into separate partitions according to the shared common partition value;
  e. establishing a ranking value of each of the rows within each separate partition according to the corresponding ordering value of each row;
  f. calculating a minimum ranking value for each separate group of grouping values which corresponds to the row within each group having the lowest ranking value;
  g. applying a minimum ranking value limit to each of the separate groups of grouping values to exclude groups of grouping values that do not meet the minimum ranking value limit, wherein the group of grouping values not excluded by the minimum ranking value limit provide the limited dataset;
  h. retrieving from memory, a designated row limit, and on condition that a number of rows in the expanded ones of the limited ones of the selected rows exceed the row limit, reducing a number of rows in the expanded ones of the limited ones of the selected rows to cause the number of rows to meet the designated row limit, but on condition that the number of rows in expanded ones of the limited ones of the selected rows falls short of the row limit, inserting additional rows of a different partition value into the expanded ones of the limited ones of the selected rows until the number of rows is equivalent to the designated row limit;

i. inserting the expanded ones of the limited ones of the selected rows into a pivot table comprising a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset, by populating each cell defined by each distinct grouping value-partition value pair with the corresponding ordering value from each distinct row in the limited dataset, and, j. displaying the pivot table in the user interface to the database application program.

12. The method of claim 11, wherein the steps of receiving a designation of a grouping column, a partition column, and an ordering column in the initial dataset are repeated for additional initial datasets in the relational database.

13. The method of claim 11, further comprising using a LIMIT SQL expression to limit the values of interest included in the partition column.

14. The method of claim 11, further comprising transmitting the limited dataset from the relational database to an application program included on a client device.

15. A non-transitory computer-readable recording medium for selectively retrieving data from an initial dataset in a relational database to provide a limited dataset for incorporation into a pivot table comprising instructions, which, when executed by one or more processors, cause the one or more processors to:

a. receive a designation of a grouping column in the initial dataset, wherein the grouping column comprises one or more groups of grouping values;

b. receive a designation of a partition column in the initial dataset, wherein the partition column comprises one or more partition values;

c. receive a designation of an ordering column in the initial dataset, wherein the ordering column comprises one or more ordering values, and wherein the initial dataset comprises one or more rows, wherein each row comprises a corresponding grouping value, a corresponding partition value, and a corresponding ordering value;

d. partition rows of the one or more rows, which share a common partition value, into separate partitions according to the shared common partition value;

e. establish a ranking value of each of the rows within each separate partition according to the corresponding ordering value of each row;

f. calculate a minimum ranking value for each separate group of grouping values which corresponds to the row within each group having the lowest ranking value;

g. apply a minimum ranking value limit to each of the separate groups of grouping values to exclude groups of grouping values that do not meet the minimum ranking value limit, wherein the group of grouping values not excluded by the minimum ranking value limit provide the limited dataset;

h. retrieve from memory of the computer a designated row limit, and on condition that a number of rows in the expanded ones of the limited ones of the selected rows exceed the row limit, reduce a number of rows in the expanded ones of the limited ones of the selected rows to cause the number of rows to meet the designated row limit, but on condition that the number of rows in expanded ones of the limited ones of the selected rows falls short of the row limit, insert additional rows of a different partition value into the expanded ones of the limited ones of the selected rows until the number of rows is equivalent to the designated row limit;

i. insert the expanded ones of the limited ones of the selected rows into a pivot table comprising a row for each distinct grouping value and a column for each distinct partition value in the limited data set, wherein each distinct grouping value and each distinct partition value forms a distinct grouping value-partition value pair that defines a unique cell in the pivot table and corresponds to a distinct row of the limited dataset, by populating each cell defined by each distinct grouping value-partition value pair with the corresponding ordering value from each distinct row in the limited dataset, and, j. display the pivot table in a user interface to a database application program.

* * * * *